US006452943B1

United States Patent
Furuya

(10) Patent No.: US 6,452,943 B1
(45) Date of Patent: Sep. 17, 2002

(54) DATA SERVER SYSTEM WHERE THE CYCLE FOR TRANSMITTING VIDEO OR AUDIO DATA IS ADJUSTED ACCORDING TO CONTROL DATA TRANSMITTED TO A TRANSMITTER BY A RECEIVER THAT MONITORS ITS BUFFER STATE

(75) Inventor: Shinji Furuya, Moriguchi (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/368,965

(22) Filed: Aug. 5, 1999

(30) Foreign Application Priority Data

Aug. 7, 1998 (JP) ............................................. 10-224508

(51) Int. Cl.[7] .............................. H04J 3/16; H04J 3/22; H04N 7/173; G06F 15/16
(52) U.S. Cl. ......................... 370/468; 370/236; 725/94; 709/219; 710/57
(58) Field of Search ............................... 725/100, 114, 725/115, 116, 131, 132, 134, 151, 152; 709/217, 218, 219; 710/57, 56, 52; 370/468, 236; H04N 7/173, 7/16; G06F 15/16

(56) References Cited

U.S. PATENT DOCUMENTS

| | | | | |
|---|---|---|---|---|
| 5,365,552 A | * | 11/1994 | Astle | 375/354 |
| 5,774,186 A | * | 6/1998 | Brodsky et al. | 348/553 |
| 5,774,455 A | * | 6/1998 | Kawase et al. | 370/232 |
| 6,012,089 A | * | 1/2000 | Hasegawa | 709/219 |
| 6,192,081 B1 | * | 2/2001 | Chiang et al. | 375/240.16 |

FOREIGN PATENT DOCUMENTS

JP      955767      2/1997

* cited by examiner

*Primary Examiner*—Vivek Srivastava
(74) *Attorney, Agent, or Firm*—Price and Gess

(57) ABSTRACT

A video server system includes a transmitter for cyclically transmitting predetermined amounts of video data that have been read from a magnetic disc drive apparatus and a receiver for receiving and reproducing the video data. A control data transmitting unit of the receiver monitors a reception buffer that temporarily stores video data. On judging that an overflow or an underflow may occur in the reception buffer during the reception of video data, the control data transmitting unit generates control data indicative of the buffer state and transmits the control data to the transmitter. A transmission cycle adjusting unit of the transmitter adjusts a cycle for transmitting predetermined amounts of video data in accordance with the control data.

6 Claims, 20 Drawing Sheets

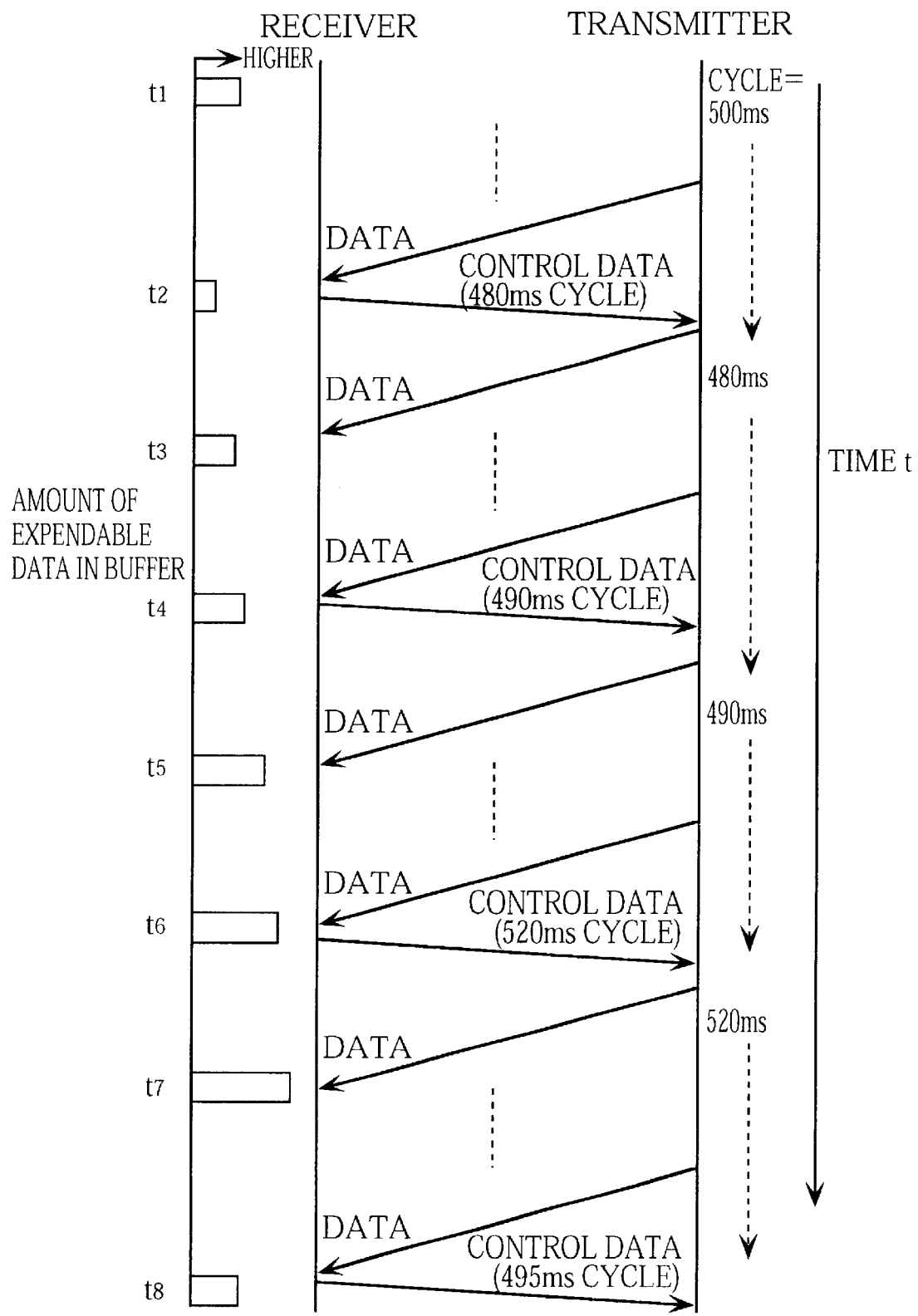

DATA SERVER SYSTEM WHERE THE CYCLE FOR TRANSMITTING VIDEO OR AUDIO DATA IS ADJUSTED ACCORDING TO CONTROL DATA TRANSMITTED TO A TRANSMITTER BY A RECEIVER THAT MONITORS ITS BUFFER STATE

This application is based on an application No. 10-224508 filed in Japan, the content of which is hereby incorporated by reference.

BACKGROUND OF THE INVENTION

1. Field of the Invention

The present invention relates to a data server system for transferring video data or audio data.

2. Prior Art

In conventional video server systems, a plurality of computers are interconnected using a network. Each computer receives and reproduces video (or audio) in real time according to video (or audio) data received from another computer. Depending on the method used to transfer data, such systems can be classified into "push-type" systems and "pull-type" systems.

In a pull-type video server system, the transmitting computer (hereafter, "transmitter") receives transfer requests (control data) from a receiving computer (hereafter, "receiver"), and transmits video data to the receiver. The receiver receives this video data and uses it to reproduce video. On the other hand, in a push-type video server system, the transmitter transmits video data to the receiver using a certain cycle. The receiver reproduces video in synchronization with this cycle. Note that while this specification refers to "video data", the same techniques can be used to transfer audio data or a combination of video and audio data.

The following describes a pull-type video server system and a push-type video server system in detail with reference to FIGS. 1~5 and FIGS. 6~9, respectively.

FIG. 1 is a block diagram showing the overall construction of a computer that can be used to construct a conventional pull-type video server system, while FIG. 2 shows the transmission and reception of video data in a pull-type video server system. In this example, computers 500 and 600 are both equipped with the same functions, including transmission and reception functions for video data.

As shown in FIG. 1, the present video server system includes computer 500, computer 600, and network 550. The computers 500 and 600 are connected via the network 550. The computer 500 includes a video data receiving unit 501, a reception buffer 502, a request receiving unit 503, a video data transmitting unit 504, a magnetic disc drive device 505, and a request transmitting unit 506. In this description, the corresponding functions of the computer 600 are given corresponding reference numerals, as shown in FIG. 2.

The following describes the transfer of video data with the computer 600 as the receiver and the computer 500 as the transmitter. As shown in FIG. 2, the request transmitting unit 606 of the receiver 600 first transmits a transfer request to the request receiving unit 503 of the transmitter 500 via the network 550 and the reception buffer 502 of the transmitter 500. This transfer request has a predetermined format, and requests the transfer of a video data block (the video data being stored having been divided in a predetermined manner into a plurality of blocks) that forms part of the video data corresponding to the video images desired by the user of receiver 600.

In the transmitter 500, the request receiving unit 503 that received the transfer request gives instructions to the video data transmitting unit 504. The video data transmitting unit 504 reads the video data block corresponding to the transfer request from the magnetic disc drive device 505 and transfers the read video data block to the reception buffer 602 of the receiver 600.

In the receiver 600, the video data receiving unit 601 reproduces the video data that has been transferred to the reception buffer 602. At the same time, the request transmitting unit 606 transmits another transfer request to the request receiving unit 503 of the transmitter 500 so that the next video data block can be received.

The transmitter 500 and the receiver 600 in present video server system repeatedly perform the operations described above, and so transfer and reproduce video data.

In this kind of pull-type video server system, the request transmitting unit 606 monitors the expendable amount of data in the reception buffer 602 and adjusts the timing at which it transmits transfer requests to the transmitter 500 to ensure that underflows and overflows of video data do not occur in the reception buffer 602. Here, "expendable data" refers to data in the reception buffer 602 that is yet to be reproduced. In this system, transfer requests are transmitted from the receiver 600 to the transmitter 500 until it appears that an overflow may occur in the reception buffer 602, so that the receiver 600 will continue to receive video data. When it appears that the further reception of video data may cause an overflow in the reception buffer 602, the request transmitting unit 606 temporarily stops transmitting transfer requests and thereby ensures that no overflow will occur.

The following describes the control procedures performed by the transmitter 500 and the receiver 600 to transfer video data in this way, and the changes in the amount of expendable data in the reception buffer 602 due to this control. This description refers to FIGS. 3~5.

FIG. 3 is a flowchart showing the control procedure when the receiver 600 in a pull-type video server system (see FIG. 2) receives video data.

In the receiver 600, a request is first received from the user and the request transmitting unit 606 transmits a transfer request to the transmitter 500 (S501).

A video data block is transmitted from the transmitter 500 to the reception buffer 602 of the receiver 600 in accordance with the transfer request. The reception buffer 602 is constantly monitored by the request transmitting unit 606 that judges whether an overflow may occur in the reception buffer 602 (S502).

If an overflow appears possible (S502:Yes), the processing stops at S502. However, if an overflow does not appear possible (S502:No), it is judged whether all of the video data corresponding to the user request has been received (S503).

If the transfer of video data is complete (S503:Yes), the processing ends. If not (S503:No), the request transmitting unit 606 transmits a transfer request for the video data block following the previously received video data block to the transmitter 500 (S504).

FIG. 4 is a flowchart showing the control procedure when the transmitter 500 in a pull-type video server system (see FIG. 2) transmits video data.

When transmitting data, the transmitter 500 first waits for a transfer request to arrive from the receiver 600 (S601).

A transfer request is received from the receiver 600 while the transmitter 500 is in this wait state. The request receiving unit 503 of the receiver 500 judges whether a transfer request has been received by constantly monitoring the reception buffer 502 (S602).

If a transfer request has not been received (S602:No), the processing returns to S601 and the transmitter continues to wait for a transfer request to arrive. If a transfer request has been received (S602:Yes), the video data transmitting unit 504 transmits a video data block corresponding to the transfer request to the receiver 600 (S603).

Next, it is judged whether the transfer requested by the transfer request has been completed (S604). If not (S604:No), the processing returns to S601. If so (S604:Yes), the processing ends.

By having the receiver 600 and the transmitter 500 perform the processing shown in FIGS. 3 and 4, video data can be transferred while the amount of expendable data in the reception buffer 602 of the receiver 600 is monitored. This is described in more detail below.

FIG. 5 shows how the amount of expendable data in the reception buffer 602 of the receiver 600 changes over time when video data is transferred in the above pull-type video server system.

Video data is transmitted from the transmitter 500 to the receiver 600 in accordance with transfer requests issued by the receiver 600. This video data accumulates in the reception buffer 602 (see FIG. 2) of the receiver 600 and increases the amount of expendable data in the reception buffer 602 (at times t1, t2, t3). Since the amount of expendable data in the reception buffer 602 decreases at a predetermined rate as the video data is reproduced, the amount of data in the buffer at any time corresponds to the difference between the amount of video data that has been transferred and the amount of video data that has been used ("expended") for reproduction. While data transfer is being performed, the request transmitting unit 606 monitors the amount of expendable data in the reception buffer 602 and when a buffer overflow appears possible (at time t3), delays the transmission of the next transfer request. In this way, the request transmitting unit 606 waits for the amount of expendable data in the reception buffer 602 to decrease due to the reproduction of the video data by the video data receiving unit 601. Once the amount of expendable data has decreased sufficiently, the request transmitting unit 606 transmits another transfer request, and the transferred video data is received as normal (at time t4).

By operating as described above, underflows and overflows are prevented for the reception buffer 602 of the receiver 600 in a pull-type video server system.

The following describes a push-type video server system. FIG. 6 is a block diagram showing the overall construction of a computer that can be used in a conventional push-type video server system. FIG. 7 shows the transmission and reception of video data in this system. As in the previous example, computers 700 and 800 are both equipped with the same functions, including transmission and reception functions for video data.

As shown in FIG. 6, the present video server system includes computer 700, computer 800, and network 750. The computers 700 and 800 are connected via the network 750.

The computer 700 includes a video data receiving unit 701, a reception buffer 702, a request receiving unit 703, a video data transmitting unit 704, a magnetic disc drive device 705, and a request transmitting unit 706. In this description, the corresponding functions of the computer 800 are given corresponding reference numerals, as shown in FIG. 7.

The following describes the transfer of video data with the computer 800 as the receiver and the computer 700 as the transmitter. As shown in FIG. 7, the request transmitting unit 806 of the receiver 800 first transmits a transfer start request to the request receiving unit 703 of the transmitter 700 via the network 750 and the reception buffer 702 of the transmitter 700.

In the transmitter 700, the request receiving unit 703 that received the transfer start request gives instructions to the video data transmitting unit 704, which operates with a predetermined cycle to read the video data blocks corresponding to the transfer start request from the magnetic disc drive device 705 and to transfer the read video data blocks to the reception buffer 802 of the receiver 800.

In the receiver 800, the transferred video data blocks are received by the reception buffer 802, and the video data receiving unit 801 reproduces the video data in synchronization with the cycle with which it has been transferred.

In the present video system, the transmitter 700 begins to transfer video data at a predetermined cycle on receiving a transfer start request from the receiver 800, and the receiver reproduces the transferred video data in synchronization with this predetermined cycle.

In the push-type video server system described above, differences between the clocks used as a standard for the processing of the transmitter 700 and receiver 800 will accumulate and can cause an underflow or overflow to occur in the reception buffer 802 of the receiver 800.

One technique for preventing such underflows and overflows has the video data transmitting unit 704 of the transmitter 700 include clock information (control data) in packets that contain the video data. The video data receiving unit 801 of the receiver 800 then reproduces the video data using this clock information. A technique that reproduces video data in this way is taught by Japanese Laid-Open Patent Application H09-55767.

FIG. 8 shows the composition of a data packet used in the push-type video server system described above.

The video data blocks described above are in fact transmitted in the form of packets. Each data packet 900 includes a header 901, clock information 902, and the actual video data 903 to be reproduced. Of these, the header 901 contains information such as the packet type, packet size, and where the packet should be transmitted, while the clock information 902 is used for adjusting the timing for data reproduction by the receiver 800 (see FIG. 7).

These data packets 900 are transferred between the transmitter 700 and the receiver 800 as described below.

FIG. 9 shows how the amount of expendable data in the reception buffer 802 of the receiver 800 changes over time when video data is transferred in the above push-type video server system. Video data is transmitted from the transmitter 700 to the receiver 800 in accordance with a transfer start request issued by the receiver 800. The receiver 800 receives the video data (at times t1, t2, t3, t4) that is transmitted with the predetermined cycle and reproduces video at a predetermined rate using the clock information. As a result, there is no great variation in the amount of expendable data in the reception buffer 802, so that underflows and overflows can be avoided.

As described above, both conventional pull-type video server systems and conventional push-type video server systems transmit video data managed by the transmitter to the receiver and have the transmitted data reproduced by the receiver while ensuring that overflows and underflows do not occur in the reception buffer of the receiver.

In the pull-type video server system described above, however, the reception buffer of the receiver has to be monitored and transfer requests have to be often transmitted to the transmitter to receive video data blocks while ensuring that overflows and underflows do not occur. This frequent transmission of transfer requests makes the transmission protocol complicated and increases the amount of traffic on the network. Accordingly, the processing to ensure that underflows and overflows do not occur in the reception buffer of the receiver places an excessive load on the entire system.

On the other hand, in a push-type video server system, underflows and overflows are avoided by including clock information in the packets transmitted from the transmitter and having the receiver perform reproduction in accordance with this clock information. Such clock information has to be generated by and added to the video data by the transmitter, and the receiver needs to be equipped with a special mechanism for reproducing the data in strict accordance with the clock information. Once again, this means that the processing to ensure that underflows and overflows do not occur in the reception buffer of the receiver places an excessive load on the entire system.

SUMMARY OF THE INVENTION

In view of the stated problems, it is an object of the present invention to provide a data server system that prevents overflows and underflows from happening in the reception buffer of the receiver using a simple control procedure and without requiring a special mechanism to be provided to the transmitter. Such data server system also reduces the amount of control data used so as not to place an excessive load on a network.

The stated object can be achieved by a data server system including a data transmitting apparatus and a data receiving apparatus, the data transmitting apparatus reading at least one of video data and audio data from a storing unit and cyclically transmitting the read data in predetermined amounts via a network, and the data receiving apparatus receiving the data transmitted by the data transmitting apparatus and reproducing at least one of video and audio based on the received data, the data receiving apparatus including: a buffer memory for temporarily storing data received by the data receiving apparatus; a detecting unit for detecting whether either of underflow and an overflow appears possible in the buffer memory while the data is being received; a generating unit for generating (1) type 1 control data when the detecting unit detects that an underflow appears possible, and (2) type 2 control data when the detecting unit detects that an overflow appears possible; a transmitting unit for transmitting the type 1 control data and the type 2 control data, and the data transmitting apparatus including: a receiving unit for receiving the type 1 control data and the type 2 control data; and an adjusting unit (1) for shortening a cycle for transmitting predetermined amounts of data when the type 1 control data has been received, and (2) for lengthening a cycle for transmitting predetermined amounts of data when the type 2 control data has been received.

In the above data server system, type 1 control data is generated and transmitted whenever an underflow appears possible in the buffer memory of the data receiving apparatus during the transfer of data. Conversely, type 2 control data is generated and transmitted whenever an overflow appears possible. On receiving the type 1 control data, the data transmitting apparatus shortens the cycle for transmitting predetermined amounts of the data. Conversely, on receiving the type 2 control data, the data transmitting apparatus lengthens the cycle for transmitting predetermined amounts of the data.

In this way, control data is transmitted only when an underflow or an overflow appears possible. As a result, less control data is required, and underflows and overflows can be prevented in the reception buffer of the reception apparatus using a simple control procedure.

Here, the data receiving apparatus may further include: a request generating unit for generating request data based on a request that relates to data and is obtained from a user; and a request transmitting unit for transmitting the generated request data, and the data transmitting apparatus may further include: a request receiving unit for receiving the transmitted request data; and an indicating unit for indicating a start of a cyclical transmission of predetermined amounts of the data to which the request data relates.

In this data server system, the data receiving apparatus generates and transmits request data in accordance with a request that relates to data and is received from the user. The data transmitting apparatus receives the transmitted request data and starts to cyclically transmit data in accordance with the request data. When an underflow appears possible in the buffer memory of the data receiving apparatus during the transfer of data, type 1 control data is generated and transmitted. Conversely, type 2 control data is generated and transmitted whenever an overflow appears possible. On receiving the type 1 control data, the data transmitting apparatus shortens the cycle for transmitting predetermined amounts of the data. Conversely, on receiving the type 2 control data, the data transmitting apparatus lengthens the cycle for transmitting predetermined amounts of the data.

As a result, control data is transferred only when an underflow or overflow may occur. This reduces the required amount of control data, and means that underflows and overflows in the reception buffer can be avoided with a simple control procedure. Since data transfer is commenced in accordance with user requests, the data receiving apparatus can receive data in a manner that is favorable to users.

The stated object can also be achieved by a data server system including a data transmitting apparatus and a data receiving apparatus, the data transmitting apparatus reading at least one of video data and audio data from a storing unit and transmitting, via a network, the read data in predetermined amounts in a transmission cycle, and the data receiving apparatus receiving the data transmitted by the data transmitting apparatus and reproducing at least one of video and audio based on the data, the data receiving apparatus including: a buffer memory for temporarily storing data received by the data receiving apparatus; a detecting unit for detecting whether either of an underflow and an overflow appears possible in the buffer memory while the data is being received; a storing unit for storing a cycle for transmitting predetermined amounts of the data; an updating unit (1) for shortening the stored cycle which the detecting unit detects that an underflow appears possible, and (2) for lengthening the stored cycle when the detecting unit detects that an overflow appears possible; first generating unit for generating type 1 control data that indicates the stored cycle; a transmitting unit for transmitting the type 1 control data, and the data transmitting apparatus including: a receiving unit for receiving the type 1 control data; and an adjusting unit for adjusting the transmission cycle in accordance with the received type 1 control data.

With the present data server system, the stored value of the adjusted cycle is updated as follows. When an underflow appears possible in the buffer memory during the transfer of data, the adjusted cycle for transmitting predetermined amounts of data is shortened, while when an overflow appears possible, the adjusted cycle for transmitting predetermined amounts of data is lengthened. Control data showing this adjusted cycle is generated and transmitted. Based on this control data, the data transmitting apparatus sets the cycle for transmitting predetermined amounts of data.

Control data is transferred only when an underflow or overflow may occur. This reduces the required amount of control data, and means that underflows and overflows in the reception buffer can be avoided with a simple control procedure. When underflows and overflows are caused by a small difference between the cycle used by the data receiving apparatus to reproduce data and the cycle used by the data transmitting apparatus to transmit data, the repeated updating of the adjusted cycle described above can amend the transmission cycle of the data transmitting apparatus to match the reproduction cycle of the data receiving apparatus. This means that the transmission of control data from the data receiving apparatus will eventually become unnecessary.

Here, the data receiving apparatus may further include a second generating unit (1) for generating, when the detecting unit detects that an underflow appears possible, type 2 control data showing a predetermined cycle that is shorter than a predetermined standard, the type 2 control data being used until an amount of data in the buffer memory increases to a certain amount, and (2) for generating, when the detecting unit detects that an overflow appears possible, type 3 control data showing a predetermined cycle that is longer than a predetermined standard, the type 3 control data being used until an amount of data in the buffer memory decreases to a certain amount, wherein when the detecting unit detects that one of an overflow and an underflow appears possible, the generating unit may not generate the type 1 control data until the amount of data in the buffer memory is equal to the certain amount, and the transmitting unit may transmit one of the type 1 control data, the type 2 control data, and the type 3 control data. The receiving unit in the data transmitting apparatus may receive one of the type 1 control data, the type 2 control data, and the type 3 control data, and the adjusting unit may adjust the transmission cycle in accordance with whichever of the type 1 control data, the type 2 control data, and the type 3 control data was received by the receiving unit.

When an underflow appears possible in the buffer memory of the data receiving apparatus during the transfer of data, type 2 control data, which indicates a predetermined cycle that is shorter than a predetermined standard, is generated and transmitted by the data receiving apparatus until the amount of data in the buffer memory reaches a certain amount. At the same time, the adjusted cycle stored by the data receiving apparatus is shortened. Once the amount of data in the buffer memory reaches the certain amount, type 1 control data indicating the adjusted cycle is generated and transmitted by the data receiving apparatus.

Conversely, when an overflow appears possible in the buffer memory, type 3 control data, which indicates a predetermined cycle that is longer than a predetermined standard, is generated and transmitted by the data receiving apparatus until the amount of data in the buffer memory reaches the certain amount. At the same time, the adjusted cycle stored by the data receiving apparatus is lengthened. Once the amount of data in the buffer memory reaches the certain amount, type 1 control data indicating the adjusted cycle is generated and transmitted by the data receiving apparatus.

Control data is transferred only when an underflow or overflow may occur. This reduces the required amount of control data, and means that underflows and overflows in the reception buffer can be avoided with a simple control procedure. When underflows and overflows are caused by a small difference between the cycle used by the data receiving apparatus to reproduce data and the cycle used by the data transmitting apparatus to transmit data, the repeated updating of the adjusted cycle described above can amend the transmission cycle of the data transmitting apparatus to precisely match the reproduction cycle of the data receiving apparatus. This means that the transmission of control data from the data receiving apparatus will eventually become unnecessary.

Here, the updating unit may update the stored cycle by making a progressively smaller adjustment to the stored cycle when the detecting unit repeatedly detects that either of an underflow and an overflow appears possible.

With the stated construction, the data receiving apparatus changes the adjusted cycle using progressively smaller adjustments whenever an underflow or overflow appears possible.

This means that the transmission cycle of the data transmitting apparatus can be quickly and efficiently adjusted so as to precisely match the reproduction cycle of the data receiving apparatus. As a result, the data receiving apparatus will eventually not need to transmit control data.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 20 shows the transition in the amount of expendable data in section of the reception buffer 402 in the receiver 400 that corresponds to the indicated channel and the transfer of control data when the present video server system transfers video data.

DESCRIPTION OF THE PREFERRED EMBODIMENTS

The following describes video server systems that are a first and second embodiment of the present invention, with reference to the drawings.

First Embodiment

Figure 1:
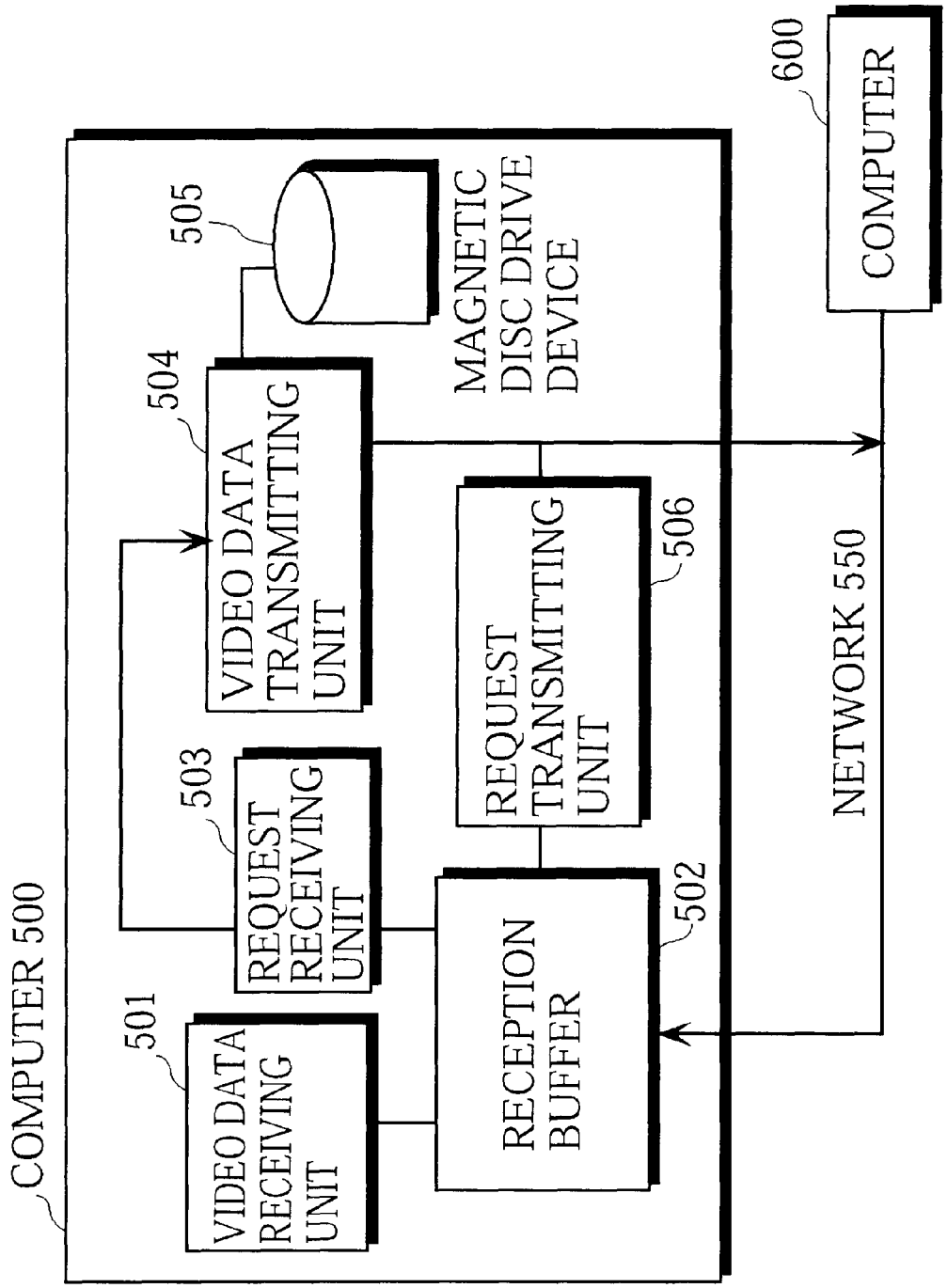
FIG. 1 is a block diagram showing the overall construction of a computer that can be used in a conventional pull-type video server system.
Figure 2:
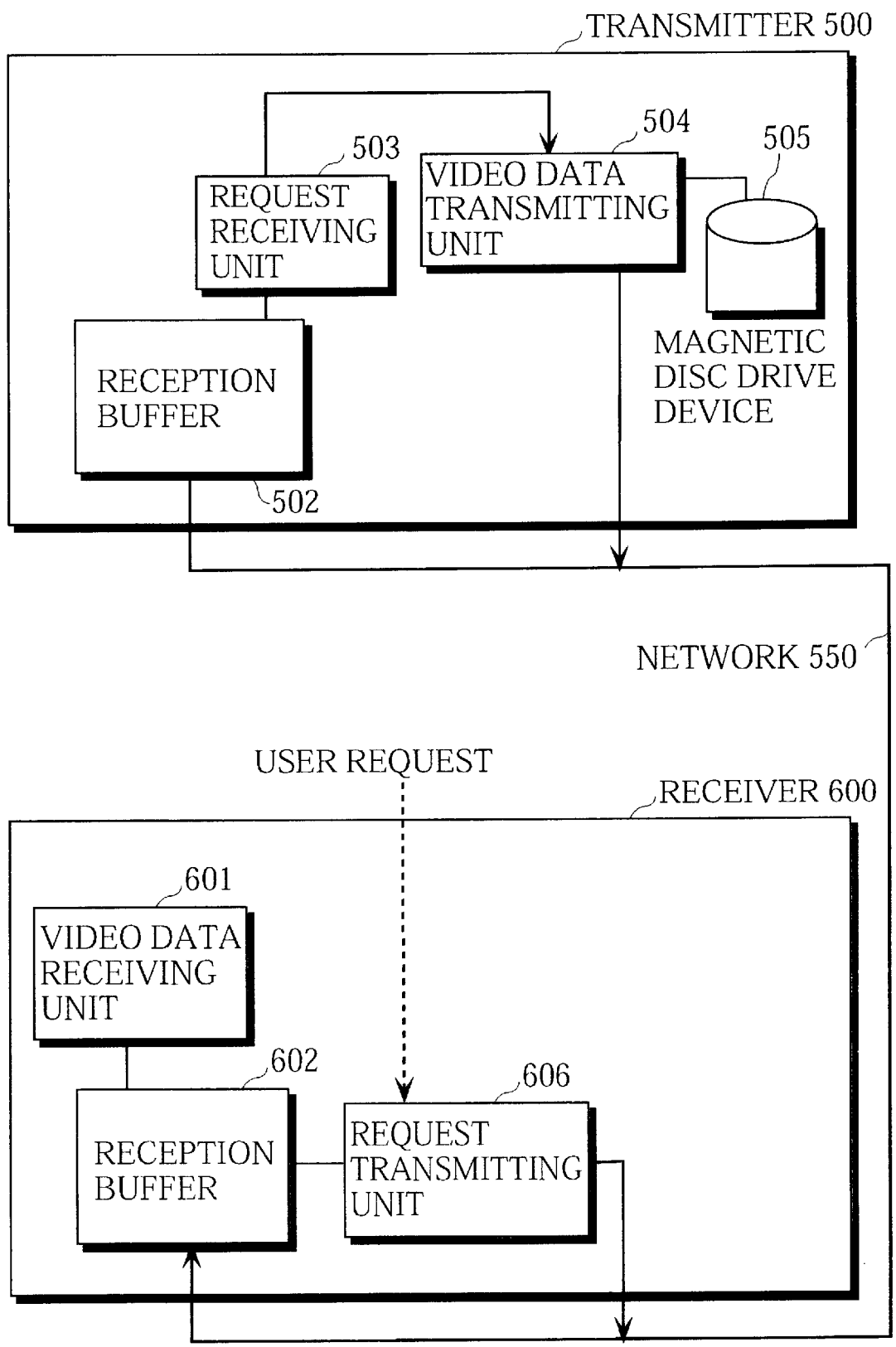
FIG. 2 shows the transmission and reception of video data in this system.
Figure 3:
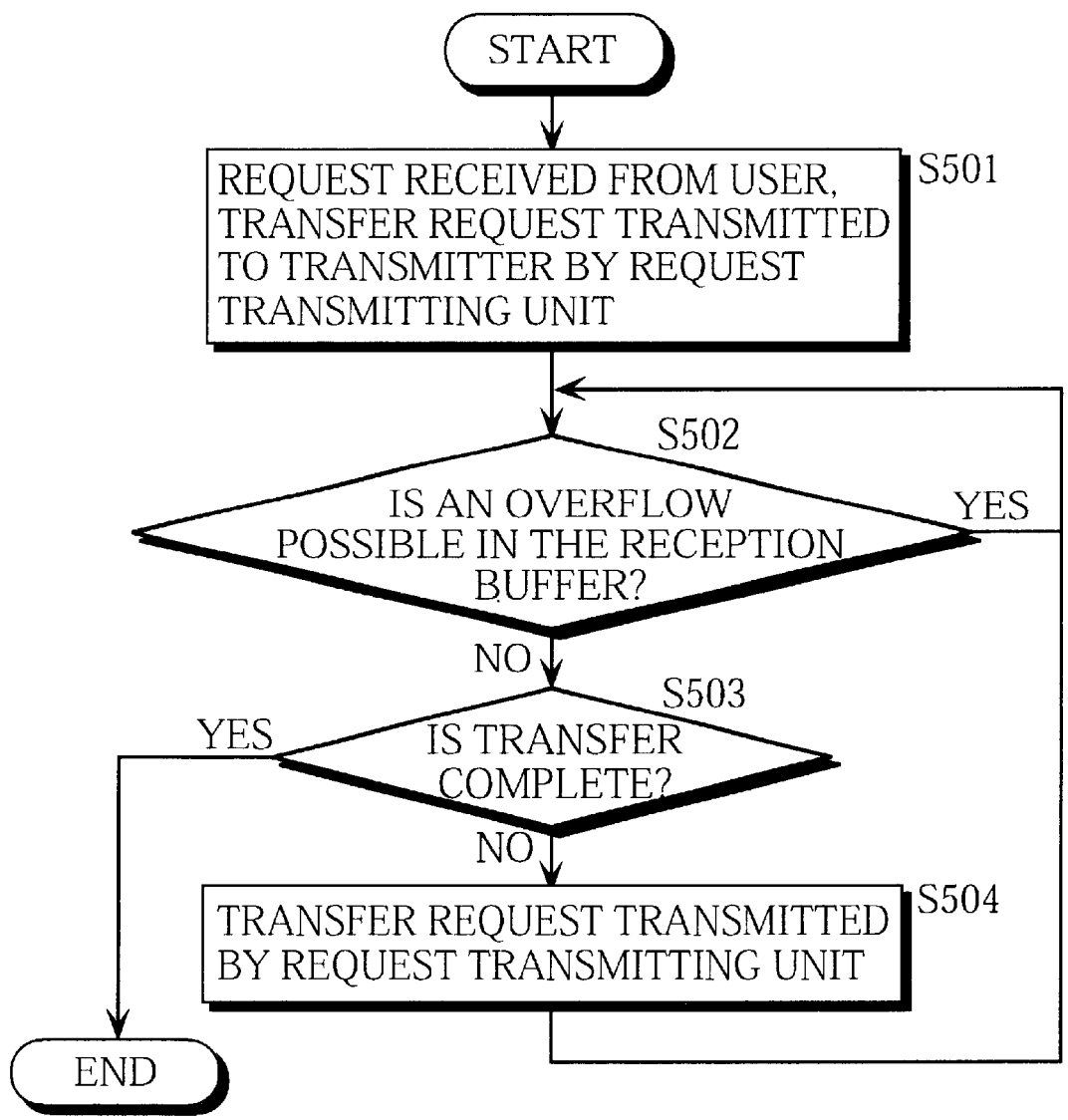
FIG. 3 is a flowchart showing the control procedure when the receiver 600 in a pull-type video server system receives video data.
Figure 4:
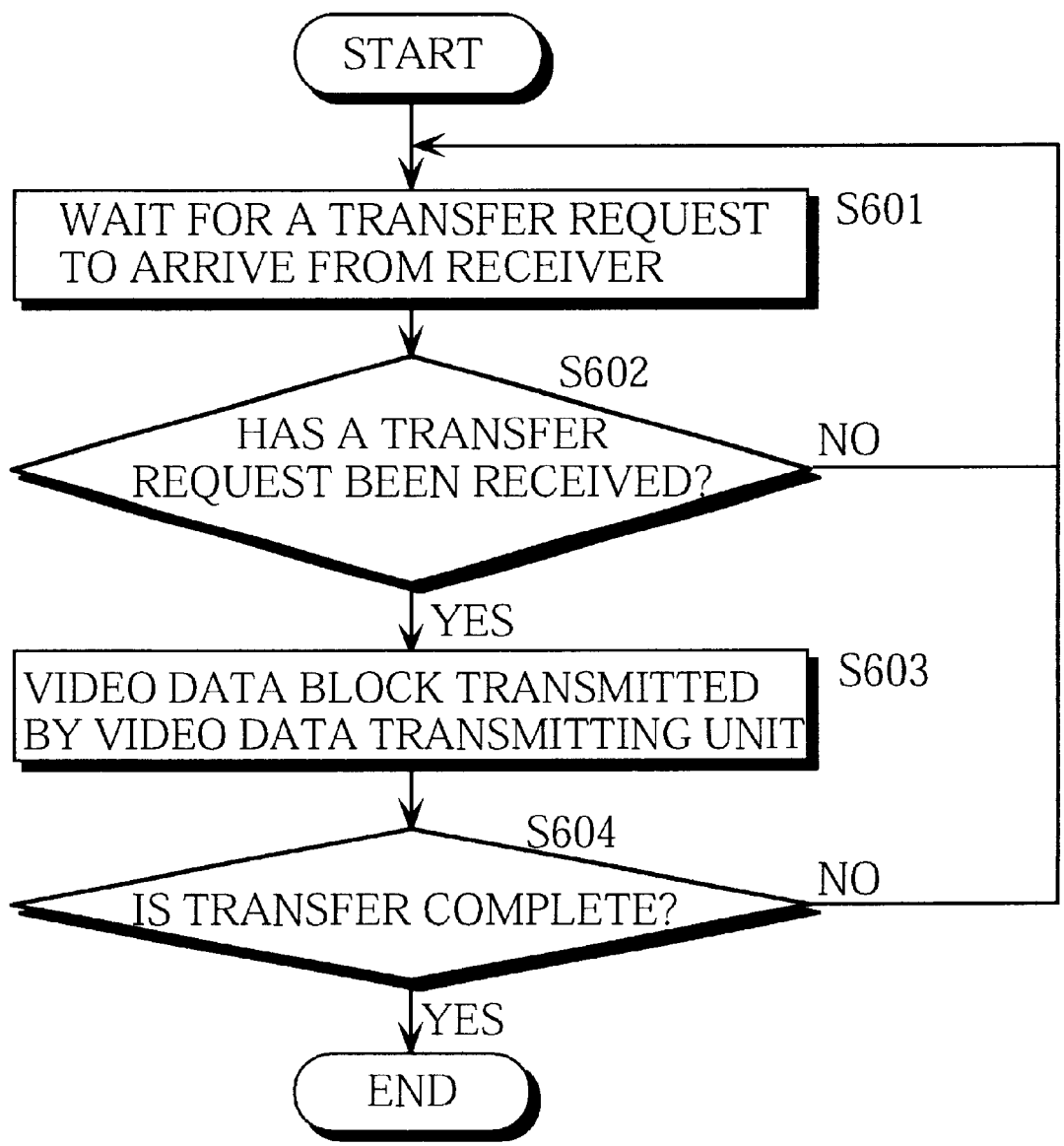
FIG. 4 is a flowchart showing the control procedure when the transmitter 500 in a pull-type video server system transmits video data.
Figure 5:
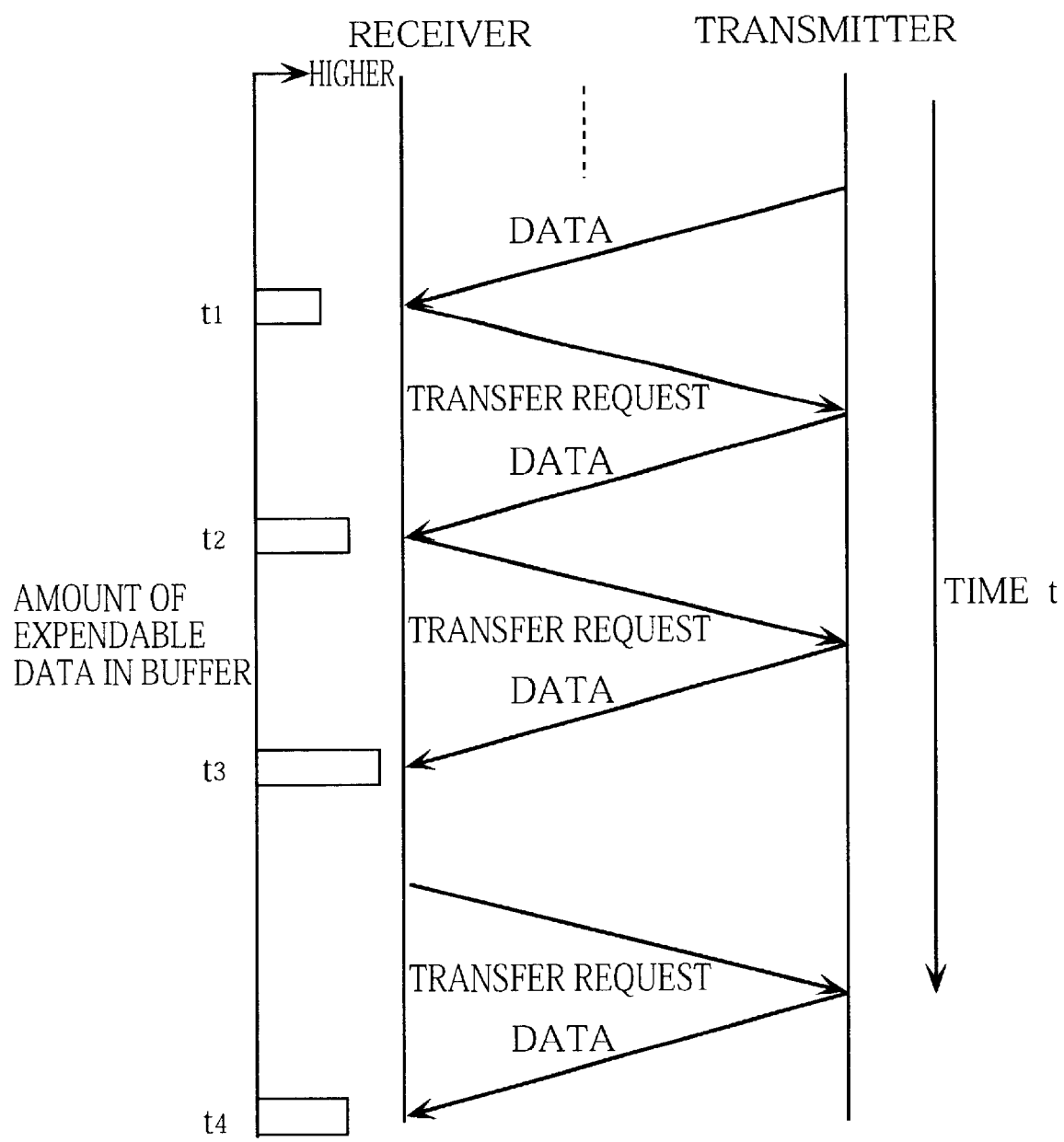
FIG. 5 shows how the amount of expendable data in the reception buffer 602 of the receiver 600 changes over time when video data is transferred in a pull-type video server system.
Figure 6:
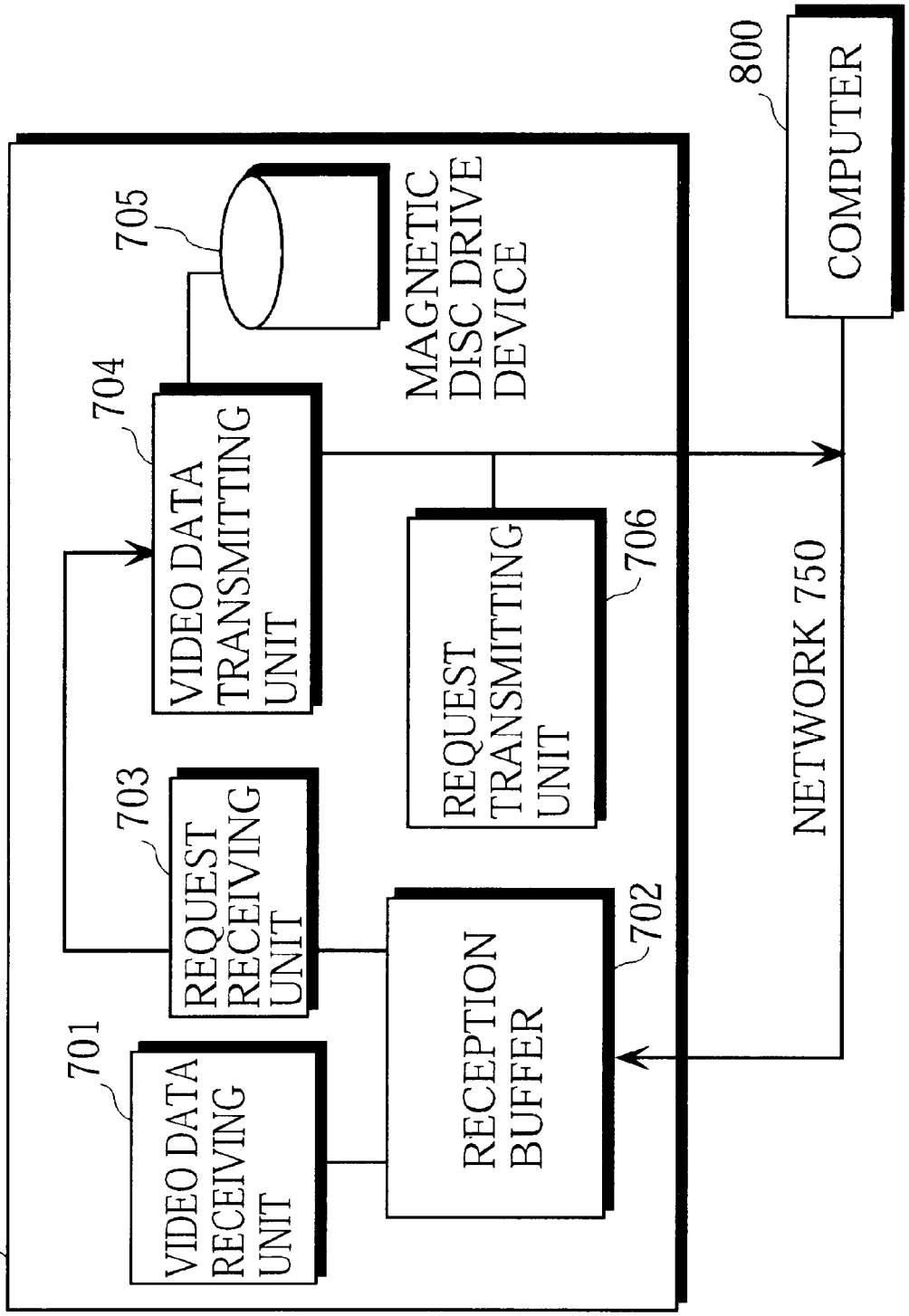
FIG. 6 is a block diagram showing the overall construction of a computer that can be used in a conventional push-type video server system.
Figure 7:
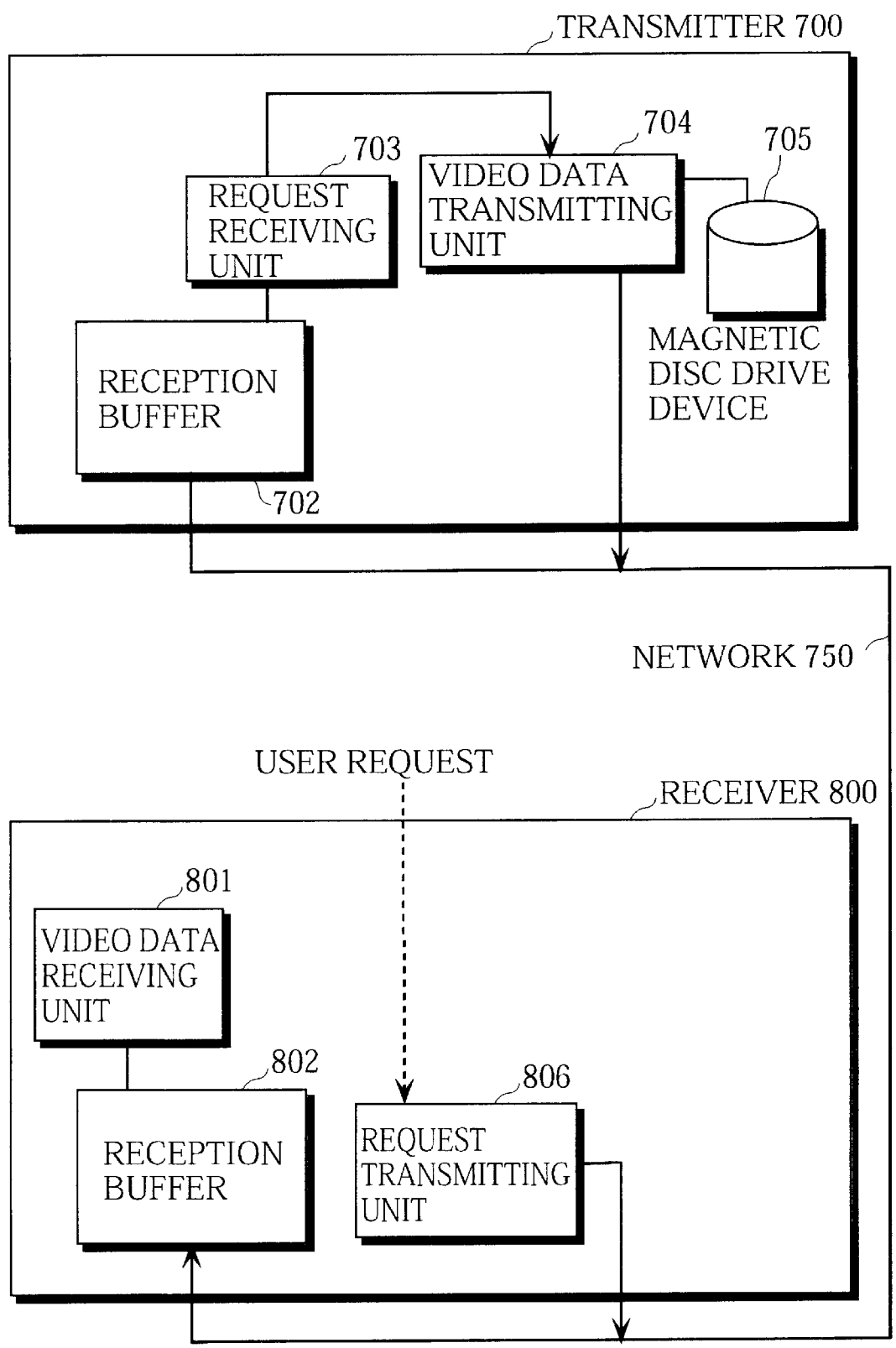
FIG. 7 shows the transmission and reception of video data in a push-type video server system.
Figure 8:
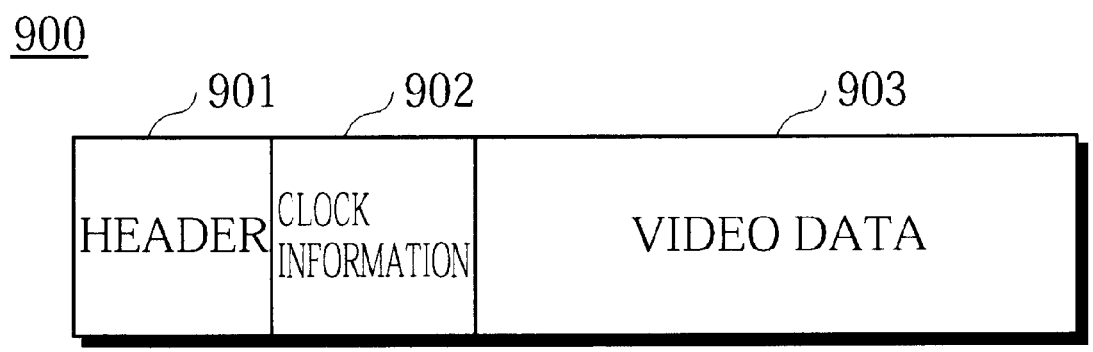
FIG. 8 shows the composition of a data packet used in a push-type video server system.
Figure 9:
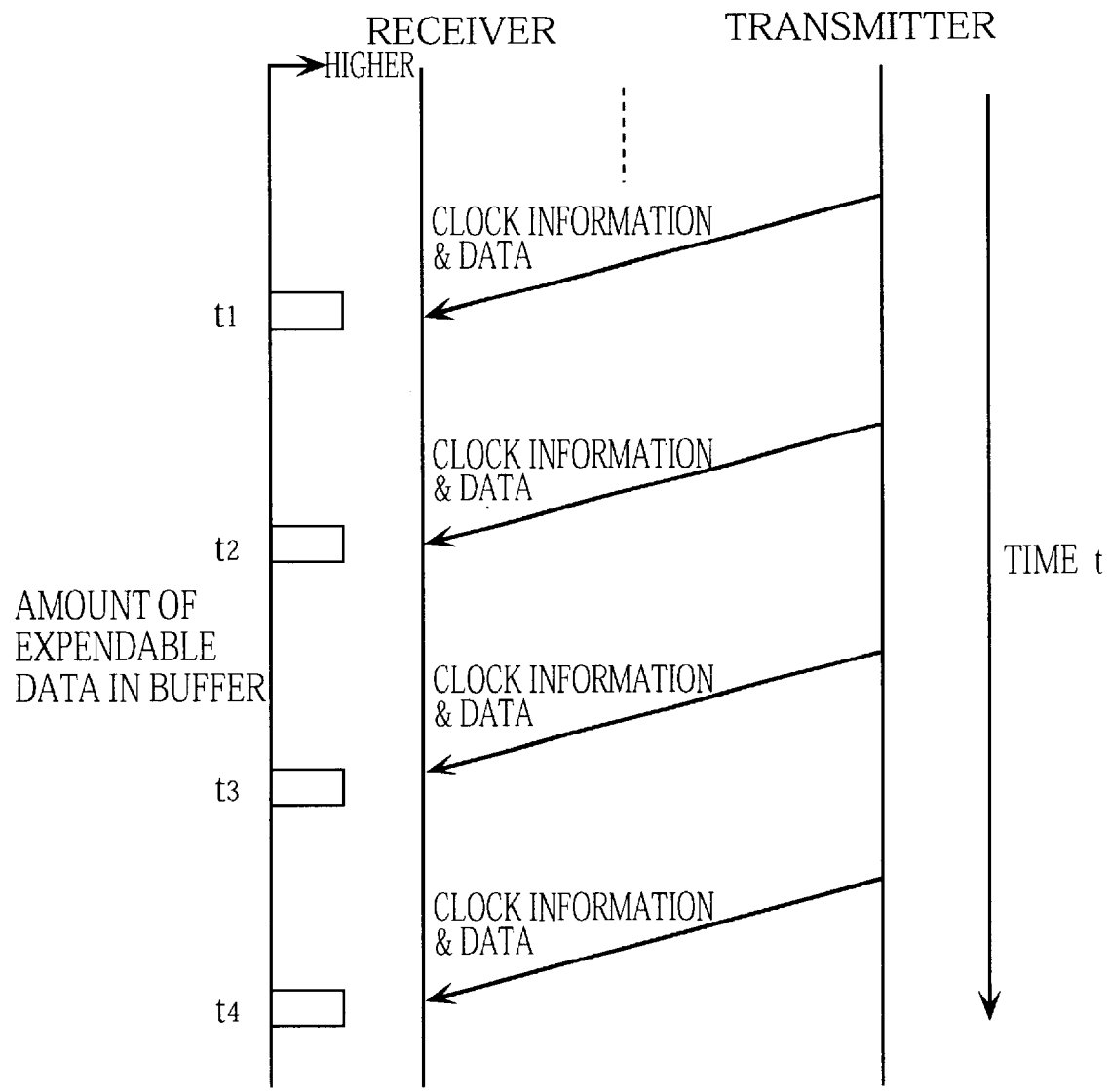
FIG. 9 shows how the amount of expendable data in the reception buffer 802 of the receiver 800 changes over time when video data is transferred in a push-type video server system.
Figure 10:
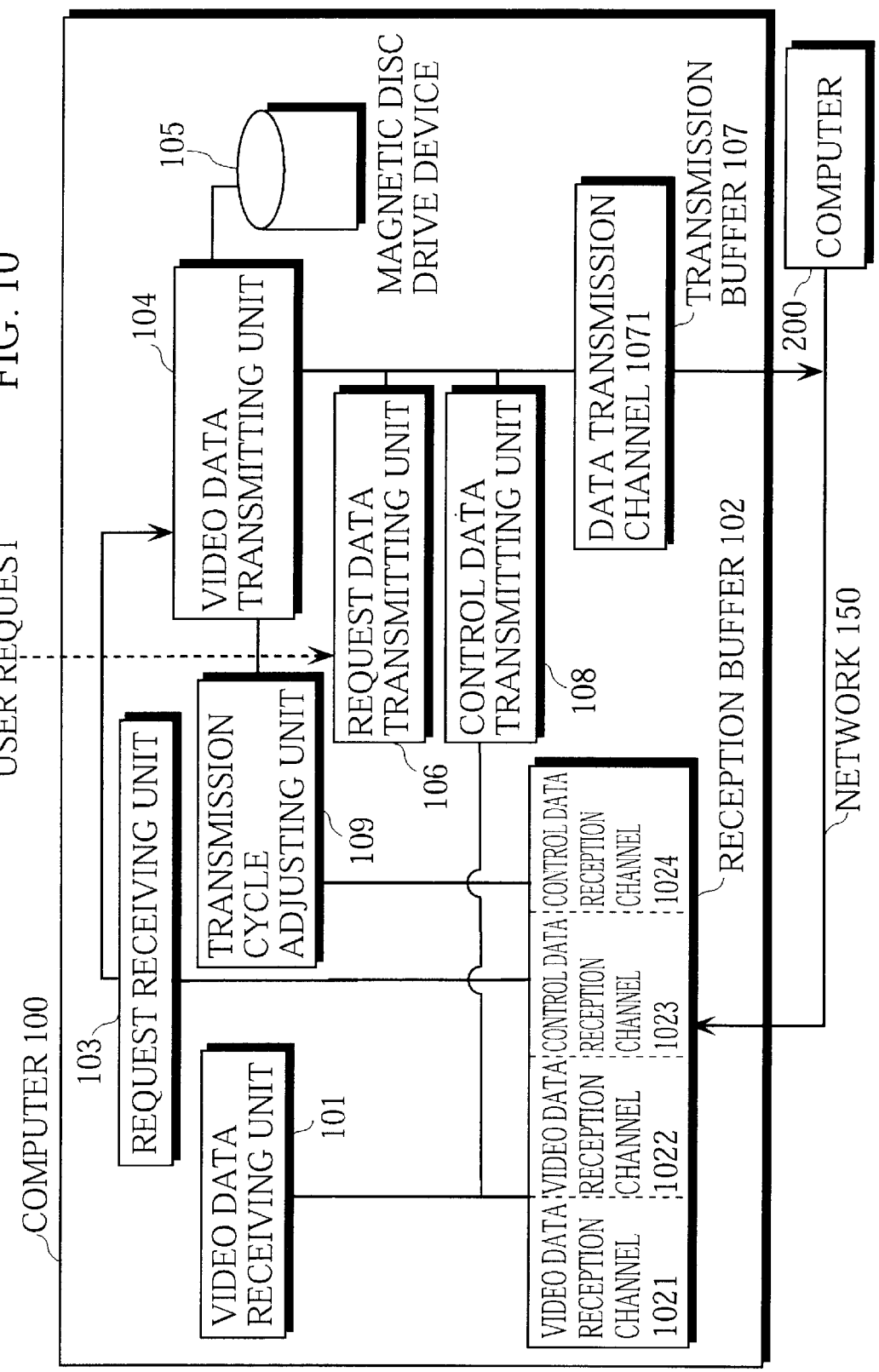
FIG. 10 is a block diagram showing the overall construction of the computer-based video server system of the first embodiment.
Figure 11:
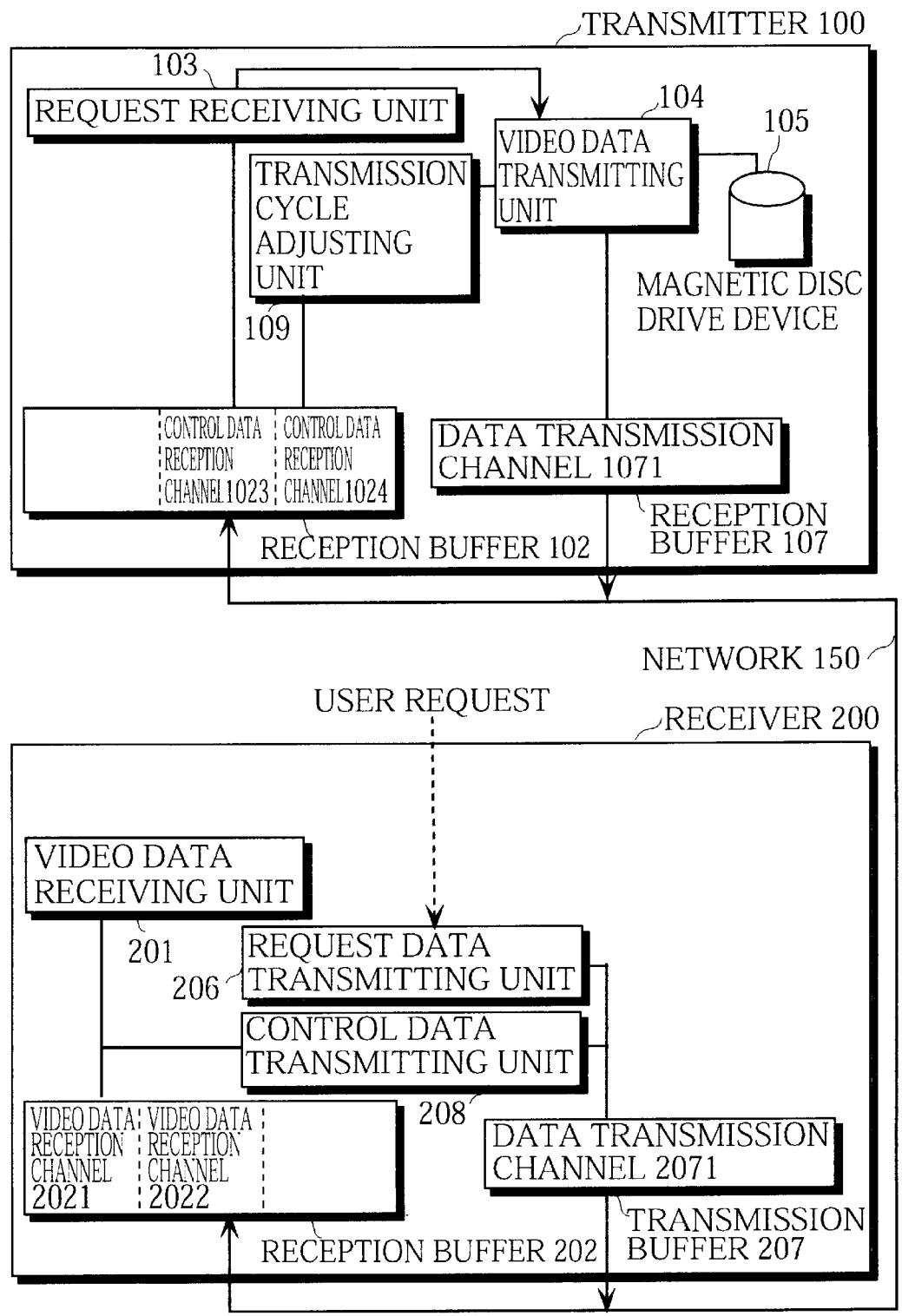
FIG. 11 shows the transmission and reception of video data (and/or audio data) by the present video server system.

A video server system that is the first embodiment of the present invention is described first. FIG. 10 is a block diagram showing the overall construction of the video server system of the first embodiment. This video server system is composed of computers that are each capable of both transmission and reception. FIG. 11 shows the transmission and reception of video data by the present video server system. As in the prior art, the concept of "video data" is used to represent video data and/or audio data.

In the present video server system, computers 100 and 200 are both able to transmit and receive video data and are provided with the same functions to do so. However, it is equally possible for the computer 100 to only include functions relating to the transmission of video data and for the computer 200 to only include functions relating to the reception of video data.

As shown in FIG. 10, the present video server system includes computer 100, computer 200, and network 150. The computer 100 has one data transmission channel 1071 and a plurality of reception channels, including the video data reception channels 1021, 1022, and the control data reception channels 1023, 1024. These channels of the computer 100 and the computer 200 are connected via the network 150. As shown in FIG. 11, the functions of computer 200 that correspond to functions in the computer 100 have been given corresponding reference numerals.

As shown in FIG. 11, video data is transferred in the present video server system from the transmitter 100 (computer 100 that transmits video data) to the receiver 200 (computer 200 that receives the video data). This video data is transferred from the transmitter 100 to the receiver 200 in a certain cycle, with the data transmission channel 1071 of the transmitter 100 being selectively connected to one of the video data reception channel 2021 and the video data reception channel 2022 of the receiver 200 that are separately assigned to video streams.

The request data is data that specifies and requests transmission of the video data desired by the user of the receiver 200, out of the plurality of such data available in the transmitter 100. This request data is transmitted by connecting the data transmission channel 2071 of the receiver 200 with the control data reception channel 1023 of the transmitter 100. Control data, which is data for controlling the transmission of video data and is described in more detail later, is transmitted by connecting the data transmission channel 2071 of the receiver 200 with the control data reception channel 1024 of the transmitter 100.

A transmission buffer 107 and a reception buffer 102 of fixed sizes are respectively provided for the data transmission channel 1071 and the reception channels 1021~1024.

The computer 100 that transmits and receives request data as described above includes, in addition to a magnetic disc drive device 105 for storing video data, a video data receiving unit 101, a request receiving unit 103, a video data transmitting unit 104, a request data transmitting unit 106, a control data transmitting unit 108, and a transmission cycle adjusting unit 109 (see FIG. 10). The same components are provided in the computer 200.

The request data transmitting unit 106 of the receiver device obtains a request for desired video images from a user, generates request data, and transmits the request data to the control data reception channel 1023 of the transmitter device via the data transmission channel 1071. The request receiving unit 103 of the transmitter device receives the request data via the control data reception channel 1023 and instructs the video data transmitting unit 104 to commence the transfer of video data in accordance with the content of the request data.

In accordance with the instructions received from the request receiving unit 103, the video data transmitting unit 104 reads one 2 MB video data block from the magnetic disc drive device 105 in each 500 ms cycle according to a cycle thread (an execution unit of a program that is cyclically executed). The video data transmitting unit 104 transmits this data via the data transmission channel 1071. The video data receiving unit 101 of the receiver device reads and reproduces the video data, which is received from the transmitter 100 via the video data reception channel 1021 or 1022 that has been assigned to the transmitted video stream, in synchronization with this cycle.

In the receiver device, the control data transmitting unit 108 monitors the amount of expendable data in the reception buffer 102 for the video data reception channels 1021 and 1022 using a read pointer and a write pointer. Here, the read pointer is an address showing at which position data should be read from the reception buffer 102 and the write pointer is an address showing at which position data should be written into the reception buffer 102.

On judging from the amount of expendable data in the reception buffer 102 that an underflow may occur in the reception buffer 102, the control data transmitting unit 108 generates control data that instructs the video data transmitting unit 104 of the transmitter device to shorten the transmission cycle for the video data. The control data transmitting unit 108 transmits this control data via the data transmission channel 1071 to the control data reception channel 1024 of the transmitter device.

Conversely, on judging from the amount of expendable data in the reception buffer 102 that an overflow may occur in the reception buffer 102, the control data transmitting unit 108 generates control data that instructs the video data transmitting unit 104 of the transmitter device to lengthen the transmission cycle for the video data. The control data transmitting unit 108 transmits this control data via the data transmission channel 1071 to the control data reception channel 1024 of the transmitter device. Here, the "generation" of these two types of control data can be performed by simply selecting control data that has been generated in advance.

The transmission cycle adjusting unit 109 receives the control data from the section of the reception buffer 102 corresponding to the control data reception channel 1024, and adjusts the cycle used by the video data transmitting unit 104 to transmit the video data in accordance with the control data.

Note that the reception buffer 102 includes a specialized area corresponding to the control data reception channel 1023 with enough capacity for storing three sets of request data and a specialized area corresponding to the control data reception channel 1024 with enough capacity for storing three sets of control data. These sets of request data and control data are processed by the request receiving unit 103 and the transmission cycle adjusting unit 109, respectively, in the order in which they arrive.

The reception buffer 102 also includes two specialized areas that respectively correspond to the video data reception channels 1021 and 1022 and each have a sufficient capacity for the video data transmitted in four cycles (that is, 8 MB). In the same way, a transmission buffer 107 with a sufficient capacity for the video data transmitted in four cycles is also provided. These buffers provided for the video data are statically reserved as described below, and are cyclically reused so that data is written into a section, this data is then read from the section, and then new data is written into the section.

Figure 12:
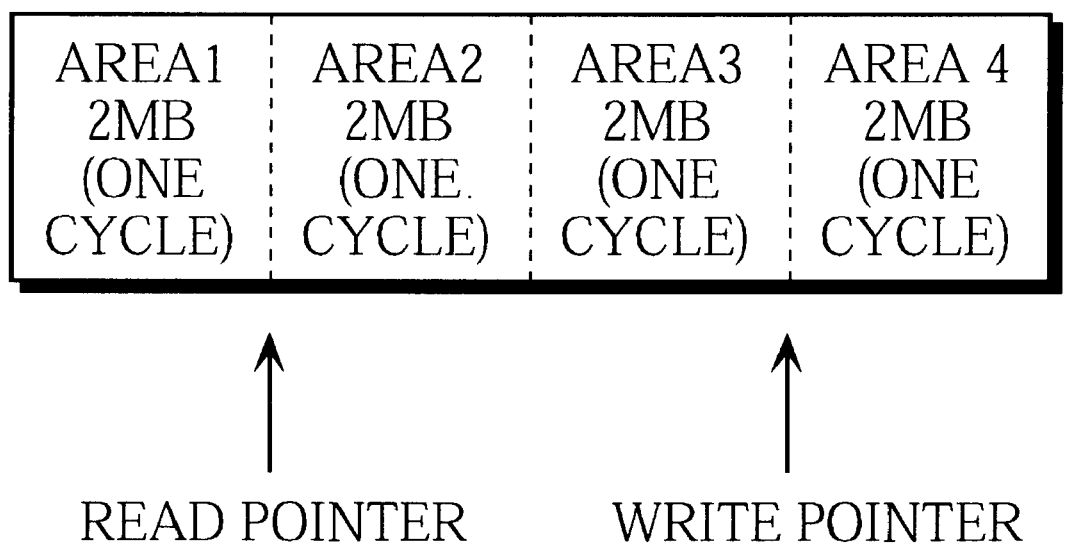
FIG. 12 shows the section of the reception buffer 102 corresponding to the video data reception channel 1021.

FIG. 12 shows the section of the reception buffer 102 corresponding to the video data reception channel 1021. Note that the section of the reception buffer 102 corresponding to video data reception channel 1022 and the section of the transmission buffer 107 corresponding to the data transmission channel 1071 are the same.

The section of the reception buffer 102 corresponding to the video data reception channel 1021 is composed of area1~area4 which are each capable for storing the video data transferred in one cycle (i.e. 2 MB). Video data that is received via the network 150 is written into area1~area4 in the reception buffer 102 in order while the write pointer (showing an address in the buffer memory at which a write is to be performed) is updated. In the same way, the video data reproduced by the video data receiving unit 101 is read from area1~area4 in the reception buffer 102 in order while the read pointer (showing an address in the buffer memory at which a read is to be performed) is updated.

In this example, it is assumed that two cycles of video data are written into area1 and area2 and a read of video data is commenced from area1. When video data has been written into area4, the processing reverts to writing video data into the areas starting from area1 (from which the previously written video data has already been read).

The following describes the transmission and reception of video data by the transmitter 100 and the receiver 200 described above, with reference to FIG. 11.

When video data is transferred by the present video server system, the request data transmitting unit 206 of the receiver 200 receives a request from the user and then transmits request data corresponding to this request to the request receiving unit 103 of the transmitter 100 via the data transmission channel 2071, the network 150, and the control data reception channel 1023. This request data includes data that indicates the user's desired video data and the data reception channel of the receiver 200 that is to receive this data. In this example, assume that the user's desired video data is "data A", which is to be received on the indicated channel, video data reception channel 2021.

On receiving the request data, the request receiving unit 103 instructs the video data transmitting unit 104 to start transferring the video data (video data A) corresponding to the request data to the specified video data reception channel (video data reception channel 2021). Based on these instructions, the video data transmitting unit 104 reads data blocks of video data A from the magnetic disc drive device 105 and starts to transfer the video data A via the data transmission channel 1071 and the network 150 to the section of the reception buffer 202 corresponding to the video data reception channel 2021 of the receiver 200. Following this, the video data transmitting unit 104 cyclically executes the reading and transmitting of the data blocks in video data A. Here, each cycle for transferring video data is normally set as 500 ms, with 2 MB of video data being transferred in that time.

Once the transmission of video data A has begun, the video data receiving unit 201 in the receiver 200 starts to reproduce video data as soon as two cycles of video data have been accumulated in the section of the reception buffer 202 corresponding to the video data reception channel 2021. From then on, the reception of video data is cyclically performed in accordance with the transmission of video data from the transmitter 100, and data is reproduced at a constant rate.

In general, the transmitter 100 and receiver 200 will not operate with exactly the same timing. The differences in timing between the two accumulate and can affect the amount of expendable data in the section of the reception buffer 202 corresponding to the channel indicated by the receiver 200. This can happen even if video data is read and transmitted by the transmitter 100 with a constant cycle and the video data is received and reproduced by the receiver 200 in accordance with this cycle.

To deal with changes in the amount of expendable data in the reception buffer 202, the control data transmitting unit 208 of the receiver 200 uses a read pointer and a write pointer to monitor the amount of expendable data in the section of the reception buffer 202 corresponding to the video data reception channel 2021 once the transfer of video data A has commenced (see FIG. 12). When necessary, the control data transmitting unit 208 transmits the control data described below to the transmission cycle adjusting unit 109 of the transmitter 100 via the data transmission channel 2071, the network 150, and the control data reception channel 1024.

On detecting from the difference in the read pointer and the write pointer that only one cycle (2 MB) of expendable (i.e., as yet unreproduced) video data is present in the section of the reception buffer 202 corresponding to the video data reception channel 2021, the control data transmitting unit 208 generates control data showing that the cycle for transmitting video data should be shortened, and transmits this control data to the transmission cycle adjusting unit 109. For the present example, control data indicating that the cycle for transmitting 2 MB of video data should be shortened from 500 ms to 480 ms is generated and transmitted.

Conversely, on detecting from the difference in the read pointer and the write pointer that three cycles (6 MB) of expendable video data are present in the section of the reception buffer 202 corresponding to the video data reception channel 2021, the control data transmitting unit 208 generates control data showing that the cycle for transmitting video data should be lengthened, and transmits this control data to the transmission cycle adjusting unit 109. For the present example, control data indicating that the cycle for transmitting 2 MB of video data should be lengthened from 500 ms to 520 ms is generated and transmitted.

The transmission cycle adjusting unit 109 of the transmitter 100 receives this control data from the control data transmitting unit 208 and adjusts the cycle for transmitting video data. The video data transmitting unit 104 thereafter reads and transmits video data in accordance with this adjusted cycle.

Figure 13:
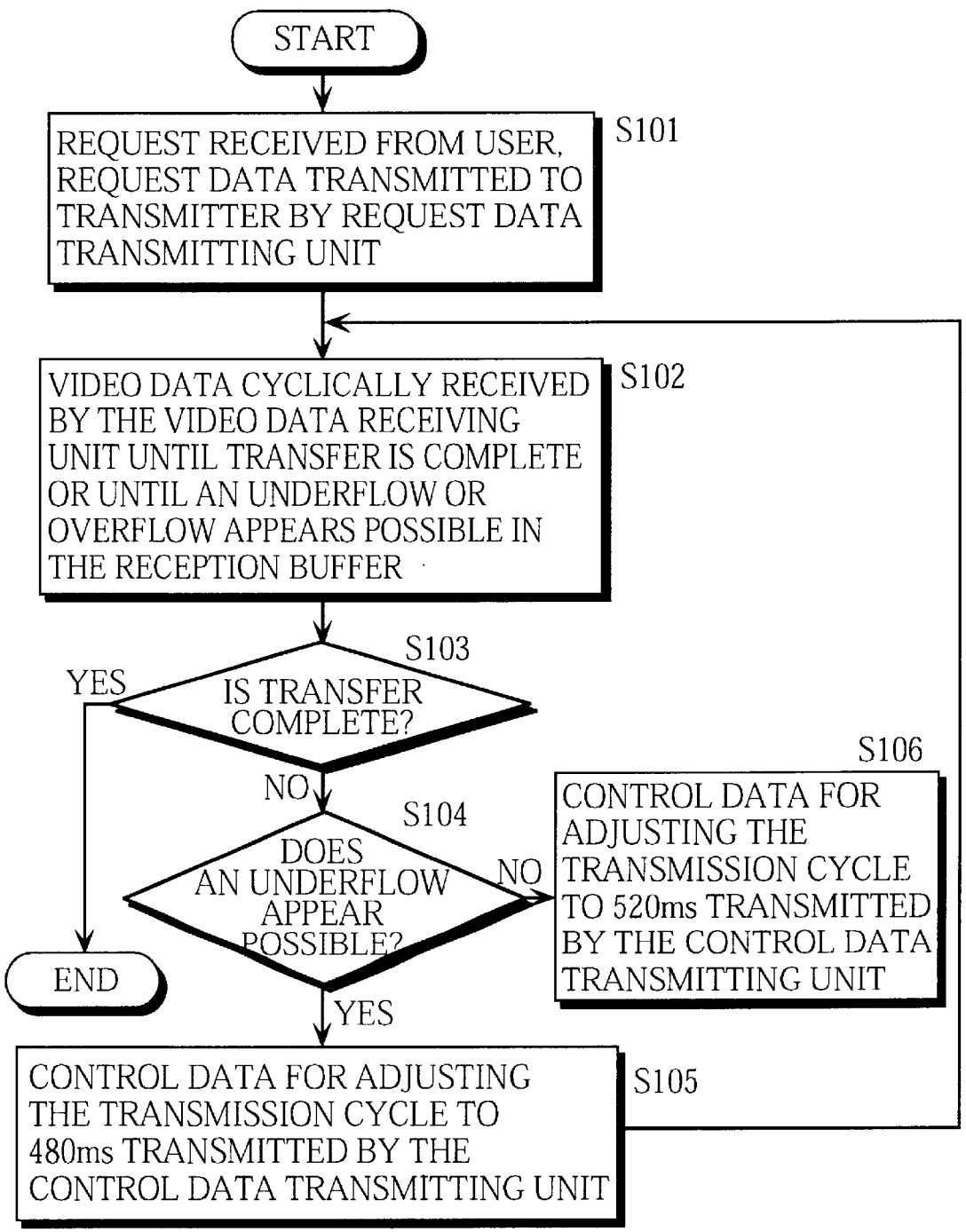
FIG. 13 is a flowchart showing the control procedure of the receiver 200 in the present video server system when receiving video data.
Figure 14:
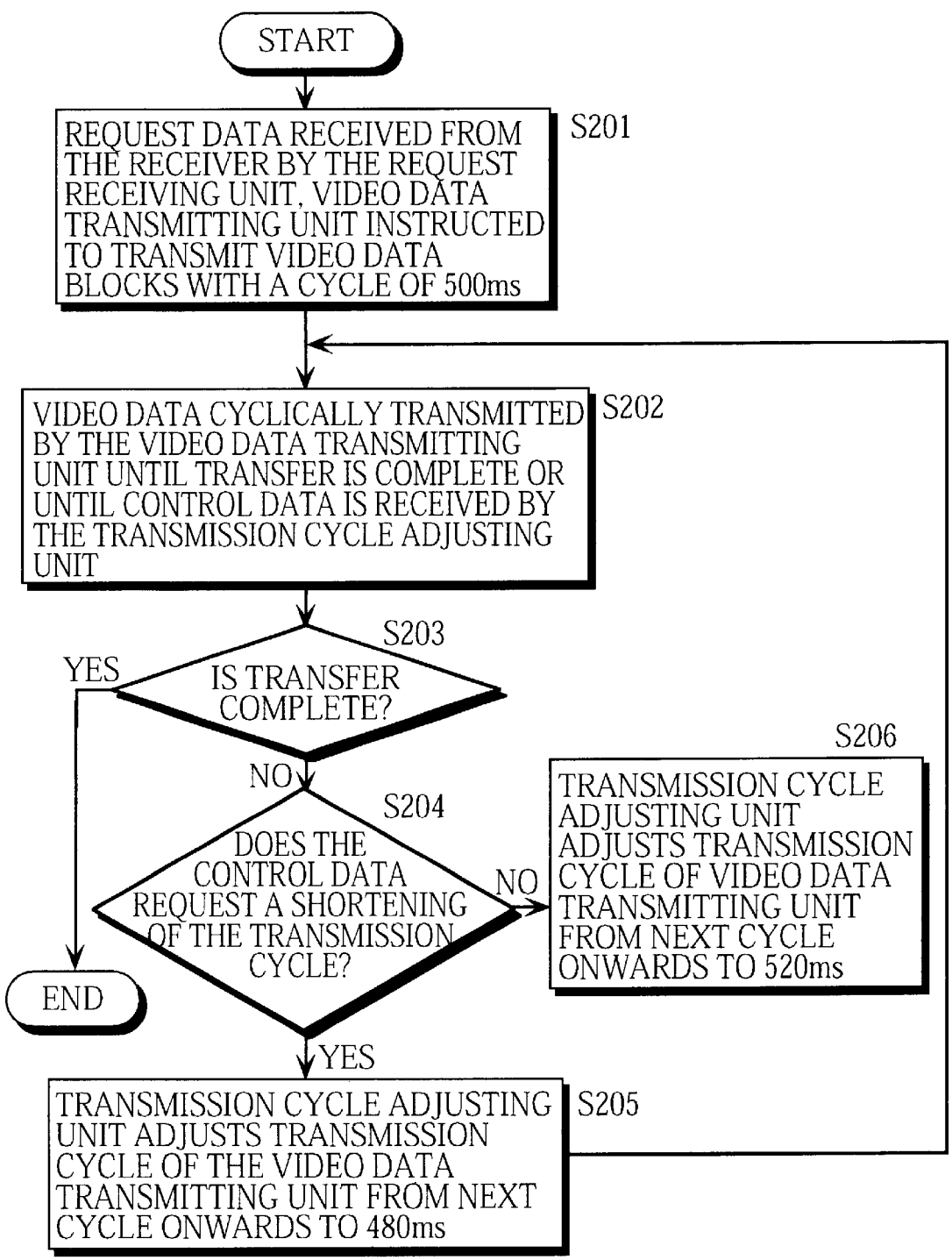
FIG. 14 is a flowchart showing the control procedure of the transmitter 100 in the present video server system when transmitting video data.

In the present video server system, the components in the receiver 200 and transmitter 100 are respectively controlled in accordance with the flowcharts in FIGS. 13 and 14. The control procedures shown in these flowcharts result in the aforementioned control data being transferred between the transmitter 100 and receiver 200, and in video data being transferred between the transmitter 100 and receiver 200 with the cycle for transmitting video data being adjusted in accordance with the control data.

FIG. 13 is a flowchart showing the control procedure of the receiver 200 (see FIG. 11) in the present video server system when receiving video data.

When the receiver 200 is to receive video data, the request data transmitting unit 206 first receives a request from the user and transmits request data to the transmitter 100 (S101).

Based on this request data, video data is cyclically transmitted from the transmitter 100 to the section of the reception buffer 202 in the receiver 200 that corresponds to the channel indicated by the request data. This transmission continues until the transfer of the video data is complete, or until an underflow or overflow of data is judged possible for the reception buffer 202 (from the monitoring of the reception buffer 202 shown in FIG. 12). The video data receiving unit 201 receives the transmitted video data and reproduces it (S102).

When the transmission of the video data is complete or an underflow or overflow of data appears possible in the reception buffer 202, it is first judged whether the transmission of the video data is complete (S103). If the transmission is complete (S103:Yes), the present processing ends. If not (S103:No), it is judged whether an underflow appears possible (S104).

If an underflow appears possible in the reception buffer 202 (S104:Yes), the control data transmitting unit 208 transmits control data to the transmitter 100 to request that the cycle for transmitting video data be adjusted to 480 ms (S105). Here, if an underflow does not appear possible (S104:No), it is judged that an overflow appears possible in the reception buffer 202, and the control data transmitting unit 208 transmits control data to the transmitter 100 to request that the cycle for transmitting video data be adjusted to 520 ms (S106).

Once control data has been transmitted in this way, the processing is repeated from S102 onwards and the video data that is transmitted from the transmitter 100 with the adjusted cycle continues to be received.

FIG. 14 is a flowchart showing the control procedure of the transmitter 100 (see FIG. 11) in the present video server system when transmitting video data.

When the transmitter 100 is to transmit video data, the request receiving unit 103 of the transmitter 100 first instructs the video data transmitting unit 104 to transmit 2MB video data blocks with a cycle of 500 ms, in accordance with the request data received from the receiver 200 (S201). Based on these instructions, the video data transmitting unit 104 reads video data blocks from the magnetic disc drive device 105 and commences the cyclic transmission of video data. The video data transmitting unit 104 continues to read and transmit data until the transfer of the video data is complete or until control data generated by the receiver 200 as described above has been received (S202).

If the transfer of video data is complete, or if control data has been received, the processing advances as follows. First, it is judged whether the transfer of video data is complete (S203), and if so (S203:Yes), the present processing ends. If the transfer of video data is not complete (S203:No), it is judged whether the transmission cycle adjusting unit 109 has received control data from the receiver 200 requesting that the cycle for transmitting data to be shortened (S204).

If the transmission cycle adjusting unit 109 has received such control data (S204:Yes), the transmission cycle adjusting unit 109 instructs the video data transmitting unit 104 to adjust the cycle for transmitting video data to 480 ms (S205). On the other hand, if the transmission cycle adjusting unit 109 has not received this kind of control data (S204:No), it is judged that the received control data requests that the cycle for transmitting video data be lengthened, so that the transmission cycle adjusting unit 109 instructs the video data transmitting unit 104 to adjust the cycle for transmitting video data to 520 ms (S206).

Once this adjustment to the cycle has been indicated, the processing in repeated from S202 onwards, so that the transmission of video data to the receiver 200 continues with the adjusted cycle.

The following describes an actual example of the transfer of video data that results from the control procedure of the receiver 200 shown in the FIG. 13 and the control procedure of the transmitter 100 shown in FIG. 14.

Figure 15:
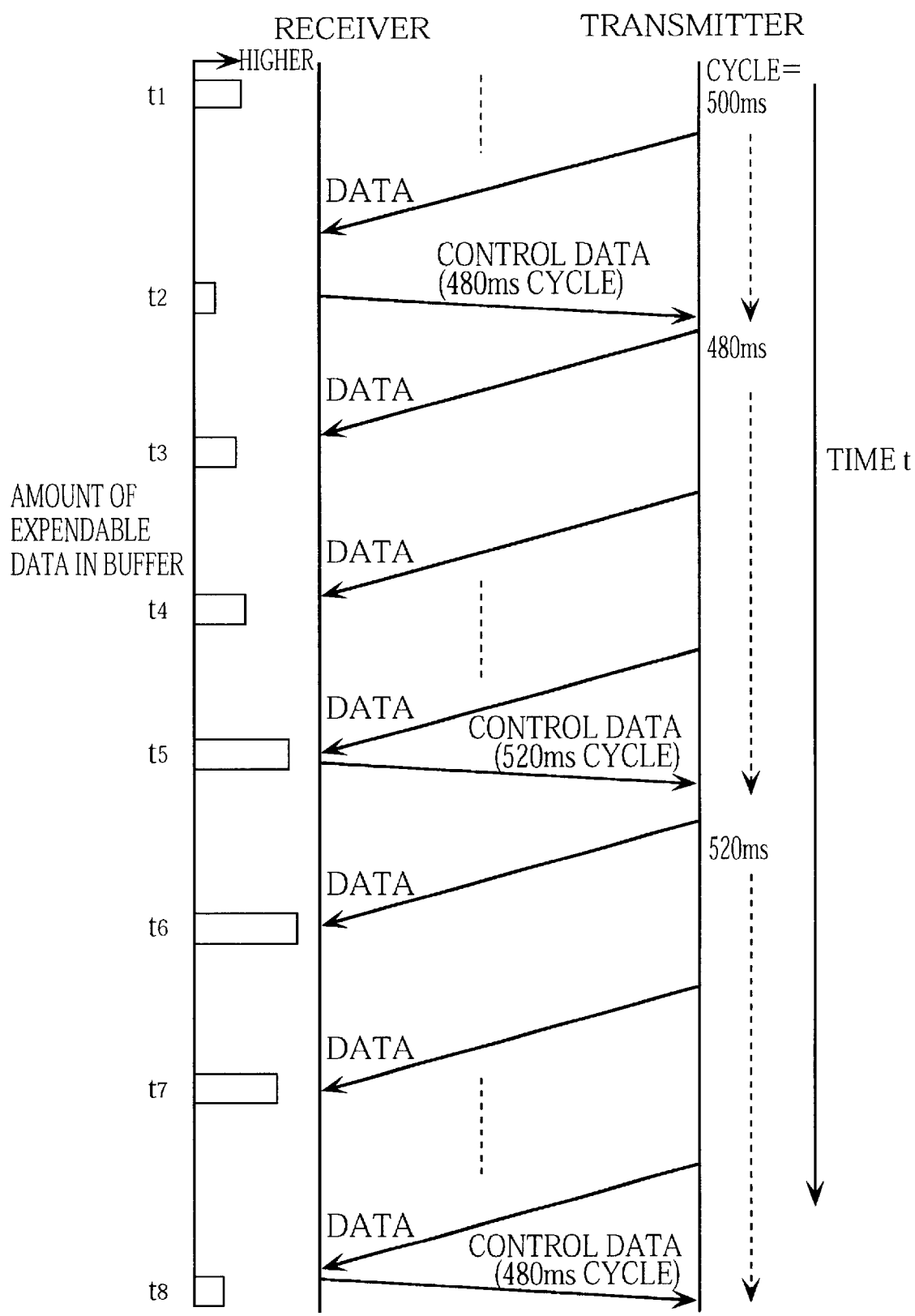
FIG. 15 shows the transition in the amount of expendable data in the section of the reception buffer 202 in the receiver 200 corresponding to the indicated channel and the transfer of control data when the present video server system transfers video data.

FIG. 15 shows the transition in the amount of expendable data in the section of the reception buffer 202 in the receiver 200 corresponding to the indicated channel and the transfer of control data when the present video server system transfers video data.

In accordance with the request data from the receiver 200, 2 MB video data blocks are transmitted from the transmitter 100 with a 500 ms cycle and are cyclically received by the receiver 200 that is controlled to reproduce the video data at a constant rate.

While the video data is being transferred, factors such as differences in timing between the transmitter 100 and the receiver 200 result in a decrease in the amount of expendable data in the reception buffer 202. When an underflow appears possible (at time=t2), control data requesting that the cycle for transmitting video data be shortened is generated by the receiver 200 and transmitted to the transmitter 100 (the process in S105 of FIG. 13). As a result, the transmitter 100 adjusts the cycle for transmitting 2 MB video data blocks from 500 ms to 480 ms (the process in S205 of FIG. 14). This adjusted cycle of 480 ms is shorter than the 500 ms cycle used by the receiver 200 to reproduce 2 MB of video data, so that the amount of expendable data in the reception buffer 202 increases (time=t3,t4).

The amount of expendable data in the reception buffer 202 increases, and when an overflow appears possible (at time t=t5), control data requesting that the cycle for transmitting video data be lengthened is generated by the receiver 200 and transmitted to the transmitter 100 (the process in S106 of FIG. 13). As a result, the transmitter 100 adjusts the cycle for transmitting 2 MB video data blocks from 480 ms to 520 ms (the process in S206 of FIG. 14). This adjusted cycle of 520 ms is longer than the 500 ms cycle used by the receiver 200 to reproduce 2 MB of video data, so that the amount of expendable data in the reception buffer 202 decreases (time=t6,t7).

When the amount of expendable data in the reception buffer 202 has sufficiently decreased (at time=t8), control data requesting that the cycle for transmitting video data be shortened is generated by the receiver 200 and transmitted to the transmitter 100 (the process in S105 of FIG. 13).

As described above, even if the amount of expendable data in the section of the reception buffer corresponding to the present channel increases above or falls below two cycles (4 MB) of data during reproduction, the video server system of this first embodiment of the present invention has control data generated and transmitted. The cycle for transferring video data is adjusted in accordance with this control data, so that underflows and overflows in the reception buffer can be completely avoided. This is achieved with a simple control procedure that requires little control data.

Since underflows and overflows are avoided, the receiver in the present video server system will always be able to read video data at a constant rate from the reception buffer, meaning that the reproduction of video images will be uninterrupted.

Second Embodiment

Figure 16:
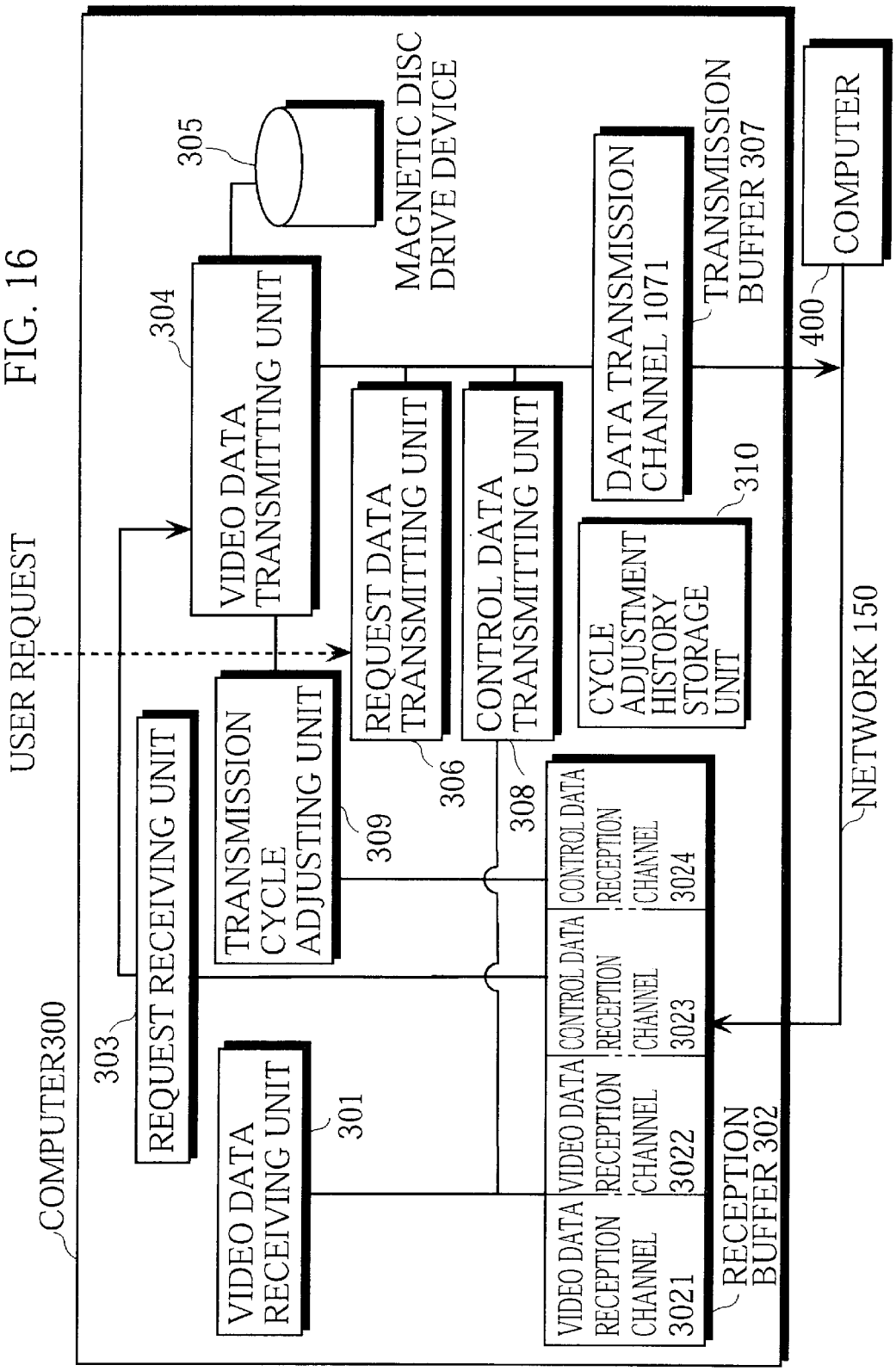
FIG. 16 is a block diagram showing the overall construction of the computer-based video server system of this second embodiment.
Figure 17:
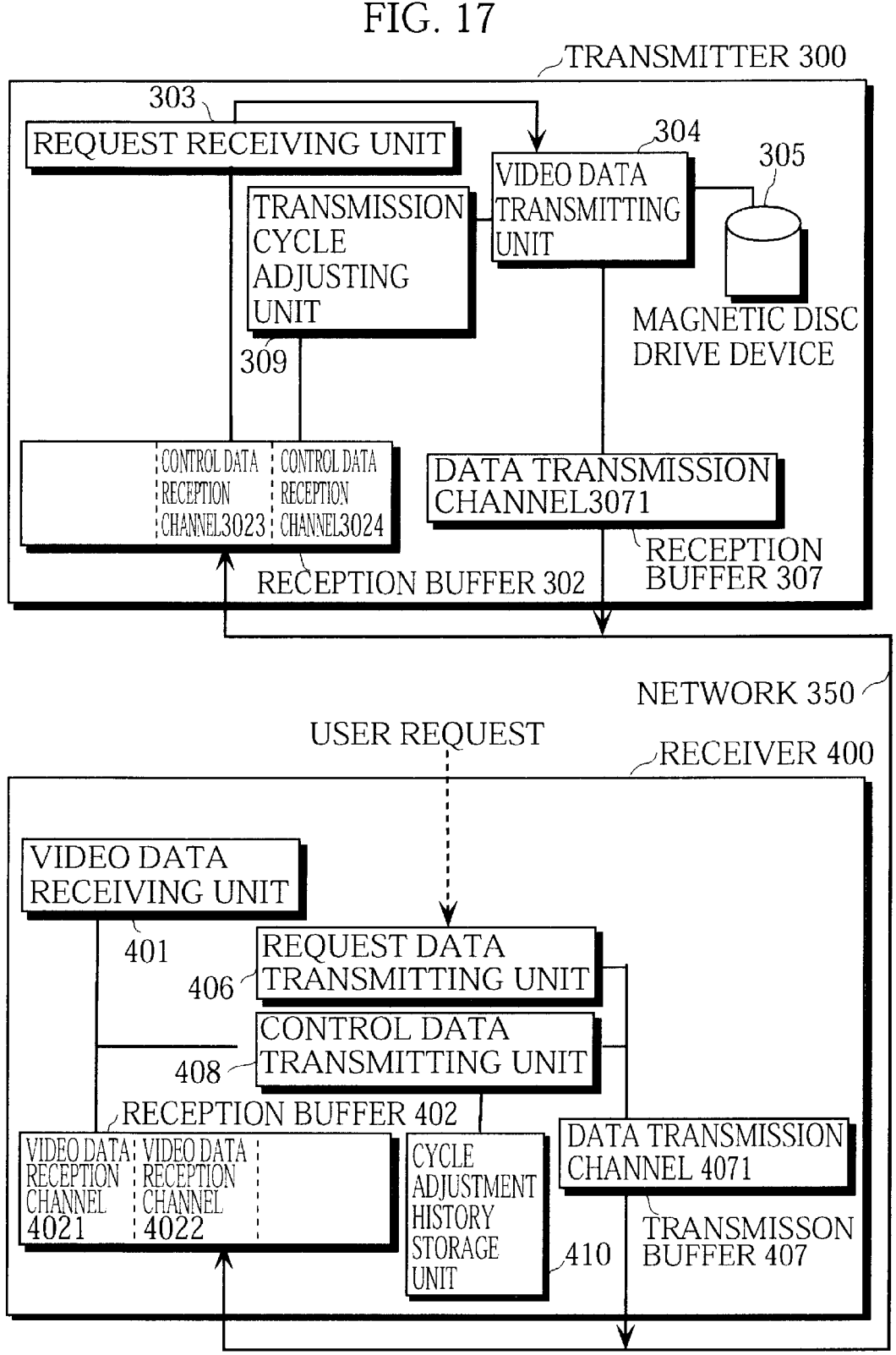
FIG. 17 shows the transfer of video data (and/or audio data) by the present video server system.

The following describes a video server system that is a second embodiment of the present invention. FIG. 16 is a block diagram showing the overall construction of the computer-based video server system of this second embodiment, while FIG. 17 shows the transfer of video data (and/or audio data) by the present video server system. Here, computers 300 and 400 are both equipped with the same functions, including transmission and reception functions for video data.

As shown in FIG. 16, the present video server system includes computer 300, computer 400, and network 350. The computers 300 and 400 are connected via the network 350. The computer 300 (400) includes a video data receiving unit 301, a reception buffer 302, a request receiving unit 303, a video data transmitting unit 304, a magnetic disc drive device 305, a request data transmitting unit 306, a transmission buffer 307, and a transmission cycle adjusting unit 309. The reception buffer 302 has sections corresponding to the video data reception channels 3021, 3022 and the control data reception channels 3023, 3024, while the transmission buffer 307 corresponds to the data transmission channel 3071. In FIG. 17, the functions of the computer 400 that correspond to those of the computer 300 are given corresponding reference numerals.

The construction and operation of the various components of the computer 300, and the selection of a channel and use of the reception buffer (see FIG. 12) when video data is transferred between the computers 300 and 400 in this embodiment are all the same as in the video server system of the first embodiment, and so will not be described further.

The computer 300 in the present video server system differs from a computer in the video server system of the first embodiment in being equipped with a cycle adjustment history storage unit 310 and in the operation of the control data transmitting unit 308 in transmitting control data while controlling the cycle adjustment history storage unit 310.

The cycle adjustment history storage unit 310 stores the history of adjustments to the cycle used to transmit video data that has been received on either of the video data reception channels 3021, 3022. The control data transmitting unit 308 monitors the amount of expendable data in the sections of the reception buffer 302 corresponding to the video data reception channels 3021, 3022, and, when an underflow or overflow appears possible, uses the adjustment history stored in the cycle adjustment history storage unit 310 to determine the transmission cycle that the transmitter will use to transmit video data. The control data transmitting unit 308 then transmits control data showing this transmission cycle to the transmitter of the video data. In this way, the cycle for transferring video data between the transmitter and the receiver is adjusted.

The following describes the transfer of video data between the computer 300 (hereafter "transmitter 300") and the computer 400 (hereafter "receiver 400"), with reference to FIG. 17. Note that the procedure for initializing the transfer of video data is the same as in the video server system of the first embodiment.

When video data is transferred by the present video server system, the request data transmitting unit 406 of the receiver 400 obtains a request from the user and then transmits request data corresponding to this request to the request receiving unit 303 of the transmitter 300 via the data transmission channel 4071, the network 350, and the control data reception channel 3023. This request data includes data that indicates the user's desired video data and the data reception channel of the receiver 400 that is to receive this data. In this example, assume that the user's desired video data is "data B", which is to be received on the indicated channel, video data reception channel 4022.

On receiving the request data, the request receiving unit 303 instructs the video data transmitting unit 304 to start transferring the video data (video data B) corresponding to the request data on the specified video data reception channel (video data reception channel 4022). Based on these instructions, the video data transmitting unit 304 reads data blocks of video data B from the magnetic disc drive device 305 and starts to transfer the video data B via the data transmission channel 3071 and the network 350 to the section of the reception buffer 402 corresponding to the video data reception channel 4022 of the receiver 400. Following this, the video data transmitting unit 304 cyclically executes the reading and transmitting of the data blocks in video data B. Here, each cycle for transferring video data is normally set as 500 ms, with 2 MB of video data being transferred in that time.

Once the transmission of video data B has begun, the video data receiving unit 401 in the receiver 400 starts to reproduce video data as soon as two cycles of video data have been accumulated in the section of the reception buffer 402 corresponding to the video data reception channel 4022. From then on, the reception and reproduction of video data are cyclically performed.

Since there are changes in the amount of expendable data in the reception buffer 402 of the receiver 400, this amount is monitored using a read pointer and a write pointer as in the video server system of the first embodiment (see FIG. 12). If, while the reproduction processing is being performed, the amount of expendable data in the reception buffer (i.e. the amount of video data indicated by the difference between read pointer and the write pointer) reaches one cycle (2 MB) of video data, it is judged that an underflow may occur. Conversely, if the amount of expendable data in the reception buffer reaches three cycles (6 MB) of video data, it is judged that an overflow may occur.

Based on the above judgement as to whether an underflow or overflow may occur, the control data transmitting unit 408 of the receiver 400 in the present video server system refers to the history data for the adjustments to the cycle that is stored by the cycle adjustment history storage unit 410. While doing so, the control data transmitting unit 408 sets the transmission cycle to be used by the transmitter 300 for transmitting video data, and transmits control data indicating this transmission cycle to the transmission cycle adjusting unit 309 of the transmitter 300. This setting of the transmission cycle is described later with reference to FIG. 18 as part of the control procedure of the receiver 400.

The control data transmitted in this way by the control data transmitting unit 408 is received by the transmission cycle adjusting unit 309 of the transmitter 300. This transmission cycle adjusting unit 309 adjusts the cycle for transmitting video data and the video data transmitting unit 304 hereafter uses this adjusted cycle to read and transmit the video data.

Figure 18:
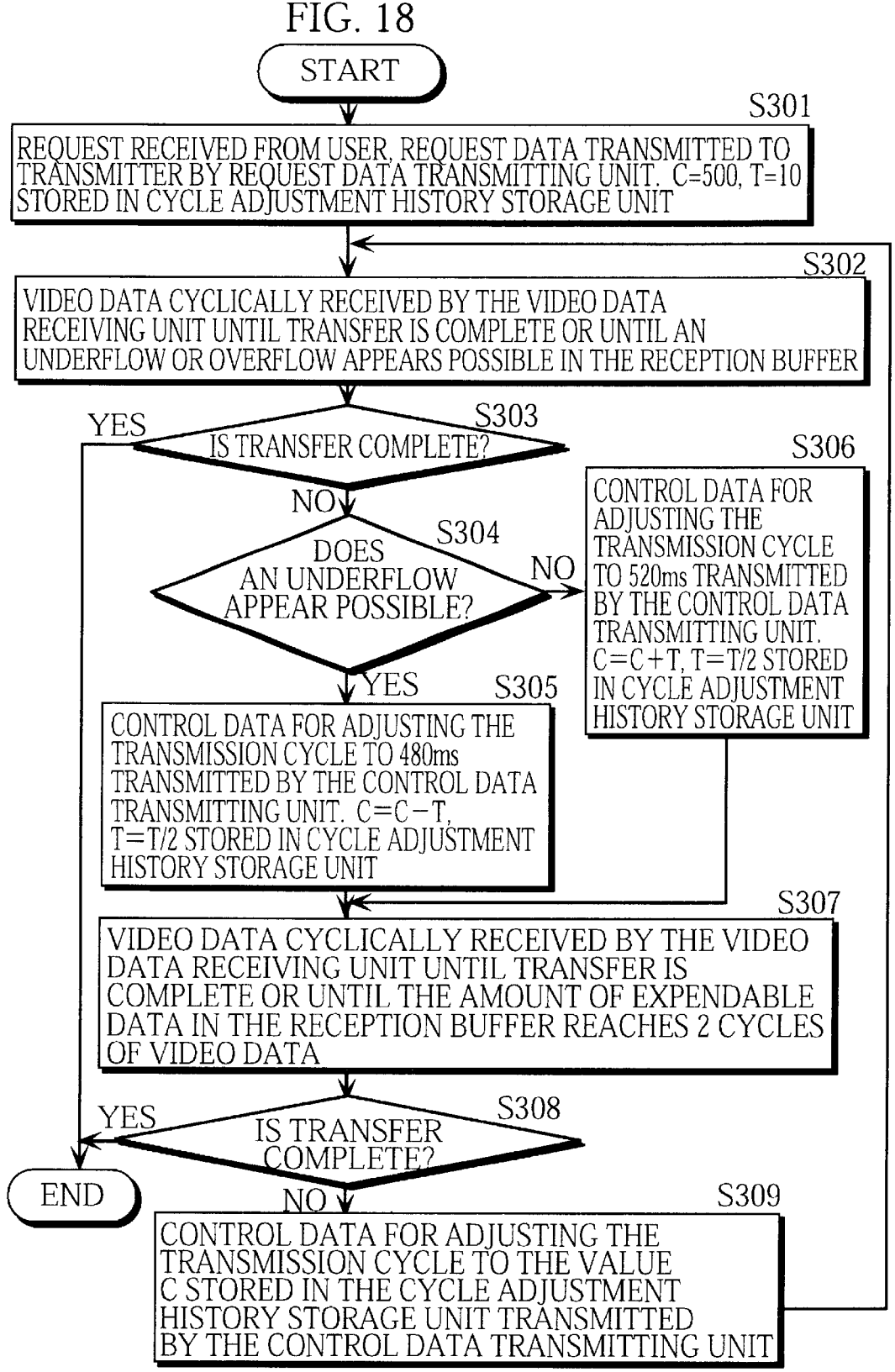
FIG. 18 is a flowchart showing the control procedure of the receiver 400 of the present video server system when receiving video data.
Figure 19:
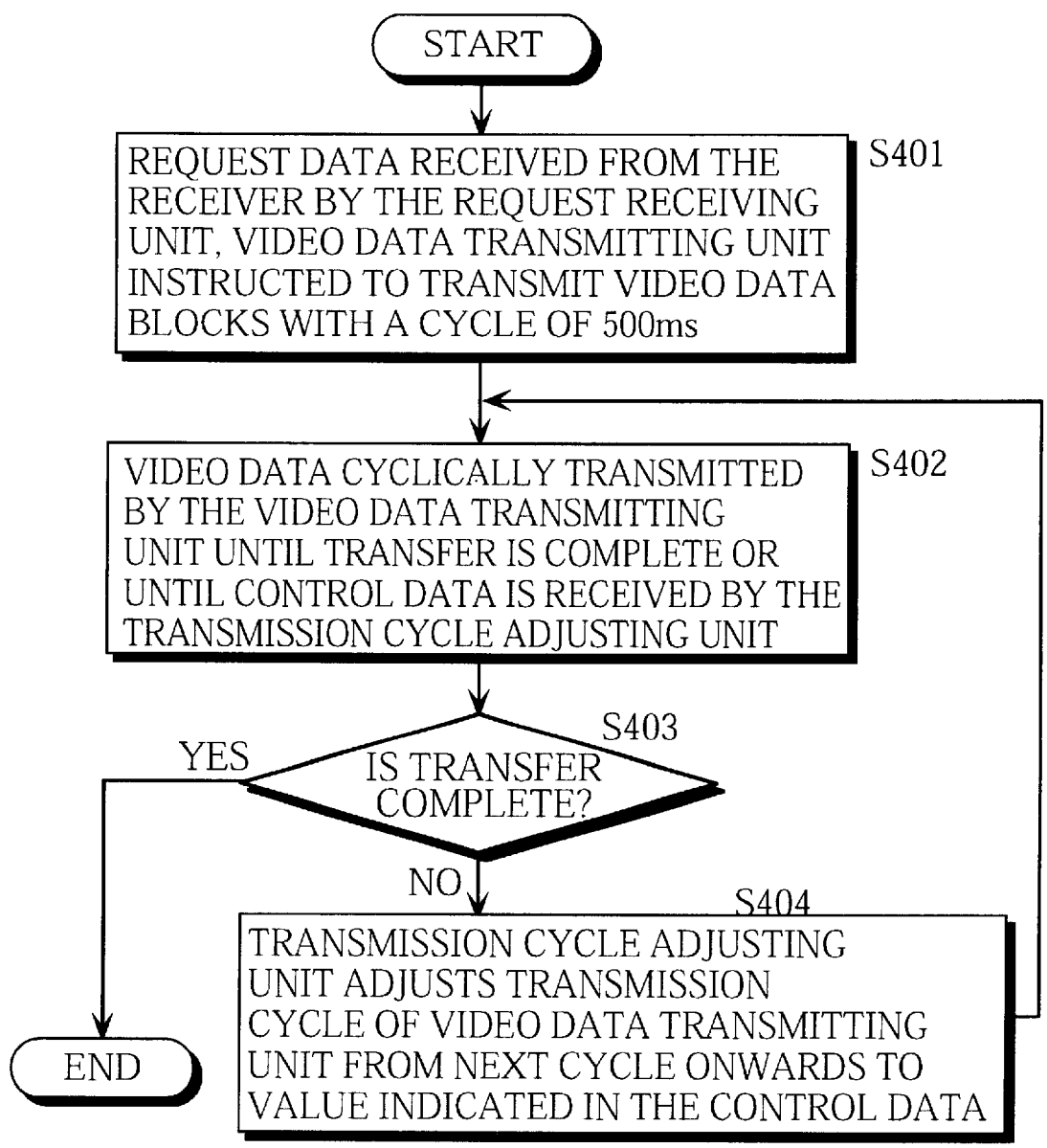
FIG. 19 is a flowchart showing the control procedure of the transmitter 300 of the present video server system when transmitting video data.

The receiver 400 and transmitter 300 of the present video server system perform the control procedures that are shown in FIGS. 18 and 19, respectively. This results in the control data described above being transferred between the transmitter 300 and the receiver 400, and in video data being transferred with a cycle that is adjusted according to the control data.

FIG. 18 is a flowchart showing the control procedure of the receiver 400 (see FIG. 17) of the present video server system when receiving video data.

When the receiver 400 is to receive video data, the request data transmitting unit 406 first receives a request from the user and transmits request data to the transmitter 300. The cycle adjustment history storage unit 410 stores the cycle C=500(ms) and adjustment T=10(ms) as initial settings (S301).

The receiver 400 continues to receive video data that is cyclically transmitted by the transmitter 300 in accordance with the above request data, with the video data being received and reproduced by the video data receiving unit 401 (S302). This continues until it is judged that the transfer of the video data is complete, or that an underflow or overflow appears possible in the reception buffer 402 (whose state is monitored as shown in FIG. 12).

If it is judged that the transfer of video data is complete or that an underflow or overflow appears possible, it is then judged whether the transfer of video data is complete (S303). If so (S303:Yes), the processing ends. If not (S303:No), it is then judged whether an underflow appears possible (S304).

If an underflow appears possible for the reception buffer 402 (S304:Yes), the control data transmitting unit 408 transmits control data to the transmitter 300 to request that the cycle for transmitting video data is adjusted to 480 ms. Meanwhile, in the cycle adjustment history storage unit 410, the cycle C is updated to C−T and the adjustment T is adjusted to T/2 (S305). If an underflow does not appear possible for the reception buffer 402 (S304:No), it is judged that an overflow is possible, so that the control data transmitting unit 408 transmits control data to the transmitter 300 to request that the cycle for transmitting video data is adjusted to 520 ms. Meanwhile, in the cycle adjustment history storage unit 410, the cycle C is updated to C+T and the adjustment T is adjusted to T/2 (S306).

Once this control data has been transmitted, the receiver 400 continues to receive video data from the transmitter 300 and the video data receiving unit 401 continues to receive and reproduce the video data until the transfer of the video data is judged to be complete or the amount of expendable data in the reception buffer 402 is judged to have reached a predetermined amount such as the video data of two cycles (i.e., 4 MB) (S307).

If it is judged that the transfer of video data is complete or that the amount of expendable data has reached the 4 MB of two cycles, the processing then proceeds to judge whether the transfer of video data is complete (S308). If so (S308:Yes), the processing ends. If not (S308:No), it is judged that the amount of expendable data in the reception buffer 402 has reached the 4 MB of two cycles, in which case the control data transmitting unit 408 transmits control data to the transmitter 300 to request that the cycle for transmitting video data is adjusted to the value of cycle C stored in the cycle adjustment history storage unit 410 (S309).

Once this control data has been transmitted, the processing is repeated from S302 onwards. The receiver 400 continues to receive video data that is transmitted by the transmitter 300 using the adjusted cycle.

As described above, if it is judged that the amount of expendable data in the reception buffer 402 has fallen to one cycle of video data so that an underflow is possible or has risen to three cycles of video data so that an overflow is possible, a transmission cycle for avoiding the occurrence of an underflow or overflow is indicated by the receiver 400 to the transmitter 300. Once the amount of expendable data in the reception buffer 402 reaches two cycles of video data, the receiver 400 informs the transmitter 300 of the transmission cycle C in the cycle adjustment history storage unit 410 to have the transmission cycle used by the transmitter 300 converge with the reproduction cycle of the receiver 400. Whenever an underflow or overflow becomes possible once again in the reception buffer 402, the above processing is repeated and the transmission cycle used by the transmitter 300 is further adjusted so that it closely matches the cycle used by the receiver 400 to reproduce the video data.

FIG. 19 is a flowchart showing the control procedure of the transmitter 300 (see FIG. 17) of the present video server system when transmitting video data.

When video data is to be transmitted, the request receiving unit 303 in the transmitter 300 instructs the video data transmitting unit 304 to transmit 2 MB video data blocks with a transmission cycle of 500 ms in accordance with the request data received from the receiver 400 (S401). In accordance with such instructions, the video data transmitting unit 304 reads the video data blocks from the magnetic disc drive device 305 and starts the cyclical transmission of video data. This reading and transmission of video data continues until the transfer of the video data is complete or until control data is received from the receiver 400 (S402).

If the transfer of video data is complete or control data has been received, the processing advances and it is then judged whether the transfer of the video data is complete (S403). If so (S403:Yes), the processing ends. If not (S403:No), the transmission cycle adjusting unit 309 instructs the video data transmitting unit 304 to adjust the transmission cycle for transmitting video data to the value indicated by the control data (S404).

After the transmission cycle adjusting unit 309 has been instructed to adjust the transmission cycle, the processing is repeated from S402 onwards, and the transmitter 300 continues to transmit video data to the transmitter 300 with the adjusted transmission cycle.

The following describes an actual example of the transfer of video data as a result of the control procedure of the receiver 400 that was shown in FIG. 18 and the control procedure of the transmitter 300 that was shown in FIG. 19.

FIG. 20 shows the transition in the amount of expendable data in the section of the reception buffer 402 in the receiver 400 that corresponds to the indicated channel and the transfer of control data when the present video server system transfers video data.

In accordance with the request data from the receiver 400, 2 MB video data blocks are transmitted from the transmitter 300 with a transmission cycle of 500 ms. These video data blocks are cyclically received by the receiver 400 that is controlled to reproduce the video data at a constant rate. In this example, suppose that the reproduction cycle of the receiver 400 is 495 ms, and the transmission cycle of the transmitter 300 is 500 ms, giving a difference in cycles of just 5 ms.

While the video data is being transferred, the difference in the cycles between the transmitter 300 and receiver 400 described above results in a decrease in the amount of expendable data in the reception buffer 402. When an underflow appears possible (at time=t2), control data requesting that the cycle for transmitting video data be shortened from 500 ms to 480 ms is generated by the receiver 400 and transmitted to the transmitter 300 (the process in S305 of FIG. 18). At the same time, the content of the cycle adjustment history storage unit 410 is updated so that the cycle C becomes C−T=500−10=490 ms and the adjustment T becomes T/2=10/2=5 ms.

On receiving this control data, the transmitter 300 adjusts the cycle for transmitting 2 MB video data blocks from 500 ms to 480 ms (the process of S404 in FIG. 19). This adjusted cycle of 480 ms is shorter than the 495 ms reproduction cycle of the receiver 400, so that the amount of expendable data in the reception buffer 402 increases from here on (time t=t3).

The amount of expendable data in the reception buffer 402 continues to increase and reaches two cycles of video data (i.e., 4 MB). At this point, control data indicating a change in the transmission cycle to the value (here, 490 ms) stored in the cycle adjustment history storage unit 410 is generated and transmitted to the transmitter 300 (the process in S309 of FIG. 18). Consequently, the transmitter 300 adjusts the cycle for transmitting 2 MB video data blocks from 480 ms to 490 ms (the process in S404 of FIG. 19). This adjusted cycle of 490 ms is still shorter than the reproduction cycle of the receiver 400, so that the amount of expendable data in the reception buffer 402 increases hereafter (time t=t5).

The amount of expendable data in the reception buffer 402 continues to increase and reaches three cycles (i.e., 6 MB) of video data (time t=t6). At this point, control data indicating that the cycle for transmitting video data blocks should be lengthened is generated and transmitted to the transmitter 300 (the process in S306 of FIG. 18). At the same time, the content of the cycle adjustment history storage unit 410 is updated so that the cycle C becomes C+T=490+5=495 ms and the adjustment T becomes T/2=5/2=2.5 ms.

On receiving this control data, the transmitter 300 adjusts the cycle for transmitting 2 MB video data blocks from 490 ms to 520 ms (the process of S404 in FIG. 19). This adjusted cycle of 520 ms is longer than the reproduction cycle of the receiver 400, so that the amount of expendable data in the reception buffer 402 decreases hereafter.

The amount of expendable data in the reception buffer 402 continues to decrease and reaches two cycles of video data (i.e., 4 MB). At this point, control data indicating a change in the transmission cycle to the value (here, 495 ms) stored in the cycle adjustment history storage unit 410 is generated and transmitted to the transmitter 300 (the process in S309 of FIG. 18). Consequently, the transmitter 300 adjusts the cycle for transmitting 2 MB video data blocks from 520 ms to 495 ms (the process in S404 of FIG. 19). This means that the cycle for transmitting video data from the transmitter 300 (which was 500 ms at the start of transmission) has become equal to the 495 ms reproduction cycle of the receiver 400.

In this way, increases and deceases in the amount of expendable data in the section of the reception buffer corresponding to indicated channel are handled by the video server system of this second embodiment by transmitting control data indicating an updated transmission cycle. Video data is transferred using the transmission cycle indicated by the control data, so that even when there is a slight difference between the reproduction cycle of the video data by the receiver and the transmission cycle of the transmitter, underflows and overflows in the reception buffer can be completely avoided with a simple control procedure that requires little control data.

In the present video server system, progressively smaller values are used to adjust the cycle that the transmitter uses to transmit video data. By having the transmission cycle converge to the reproduction cycle of the receiver, any difference between the timing used by the receiver and the transmitter can be completely absorbed within the system, so that the transmission of control data by the receiver will eventually become unnecessary. Since underflows and overflows do not occur, the receiver in the present video server system will always be able to read video data at a constant rate from the reception buffer, meaning that the reproduction of video images will be uninterrupted.

Note that while the above embodiments describe the video server systems that are composed of two computers, the present invention can also be applied to video server systems where video data is transferred between three or more computers.

In the present embodiments, different channels are assigned as the channel for receiving request data and the channel for receiving control data, although both these types of data may be received on the same channel. When doing so, the request data and control data can be identified through the use of tags and so have the appropriate processing performed.

Similarly, while the above embodiments state that user requests are transmitted from the receiver to the transmitter, the transmitter may instead receive requests directly from the user.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A data server system comprising a data transmitting apparatus and a data receiving apparatus, the data transmitting apparatus reading at least one of video data and audio data from a storing unit and transmitting, via a network, the read data in predetermined amounts in a transmission cycle, and the data receiving apparatus receiving the data transmitted by the data transmitting apparatus and reproducing at least one of video and audio based on the data, the data receiving apparatus including:
- a buffer memory for temporarily storing data received by the data receiving apparatus;
- detecting means for detecting whether either of an underflow and an overflow appears possible in the buffer memory while the data is being received;
- storing means for storing a cycle for transmitting predetermined amounts of the data;
- updating means
  (1) for shortening the stored cycle when the detecting means detects that an underflow appears possible, and
  (2) for lengthening the stored cycle when the detecting means detects that an overflow appears possible;
- first generating means for generating type 1 control data that indicates the stored cycle;
- transmitting means for transmitting the type 1 control data, and the data transmitting apparatus including:
- receiving means for receiving the type 1 control data; and
- adjusting means for adjusting the transmission cycle in accordance with the received type 1 control data.

2. A data server system according to claim 1, wherein the data receiving apparatus further includes a second generating means
  (1) for generating, when the detecting means detects that an underflow appears possible, type 2 control data showing a predetermined cycle that is shorter than a predetermined standard, the type 2 control data being used until an amount of data in the buffer memory increases to a certain amount, and
  (2) for generating, when the detecting means detects that an overflow appears possible, type 3 control data showing a predetermined cycle that is longer than a predetermined standard, the type 3 control data being used until an amount of data in the buffer memory decreases to a certain amount, wherein when the detecting means detects that one of an overflow and an underflow appears possible, the generating means does not generate the type 1 control data until the amount of data in the buffer memory is equal to the certain amount, and the transmitting means transmits one of the type 1 control data, the type 2 control data, and the type 3 control data, and wherein the receiving means in the data transmitting apparatus receives one of the type 1 control data, the type 2 control data, and the type 3 control data, and the adjusting means adjusting the transmission cycle in accordance with whichever of the type 1 control data, the type 2 control data, and the type 3 control data was received by the receiving means.

3. A data server system according to claim 1, wherein the updating means updates the stored cycle by making a progressively smaller adjustment to the stored cycle when the detecting means repeatedly detects that either of an underflow and an overflow appears possible.

4. A computer-readable storage medium storing a program that has a computer read at least one of video data and audio data from a storing unit and cyclically transmit the read data in predetermined amounts via a network to a data receiving apparatus, the data receiving apparatus including:
- a buffer memory for temporarily storing data received by the data receiving apparatus;
- detecting means for detecting whether either of an underflow and an overflow appears possible in the buffer memory while the data is being received,
- storing means for storing a cycle for transmitting predetermined amounts of the data;
- updating means
  (1) for shortening the stored cycle when the detecting means detects that an underflow appears possible, and
  (2) for lengthening the stored cycle when the detecting means detects that an overflow appears possible;
- first generating means for generating one of a type 1 control data and a type 2 control data, which respectively, varies the stored cycle;
- transmitting means for transmitting one of the type 1 control data and the type 2 control data, and
- the program having the computer
  (1) shorten the cycle for transmitting the predetermined amounts of data when the type 1 control data has been received from the data receiving apparatus, and
  (2) lengthen the cycle for transmitting the predetermined amounts of data when the type 2 control data has been received from the dam receiving apparatus.

5. A computer-readable storage medium storing a program that has a computer receive at lease one of video data and audio data and reproduce at least one of video and audio based on the received data, the data having been read from a storing unit and cyclically transmitted in predetermined amounts via a network by a data transmitting apparatus to a data receiving apparatus, the data transmitting apparatus reading at least one of video data and audio data from a storing unit and transmitting, via a network, the read data in predetermined amounts in a transmission cycle, and the data receiving apparatus receiving the data transmitted by the data transmitting apparatus and reproducing at least one of video and audio based on the data, the data receiving apparatus including:
- storing means for storing a cycle for transmitting predetermined amounts of the data;
- detecting means for detecting whether either of an underflow and an overflow appears possible in the buffer memory while the data is being received;
- updating means
  (1) for shortening the stored cycle when the detecting means detects that an underflow appears possible,
  (2) for lengthening the stored cycle when the detecting means detects that an overflow appears possible; and
- first generating means for generating one of type 1 control data and a type 2 control data, which respectively, varies the stored cycle;
- the program having the computer
  (1) temporarily store data received from the data transmitting apparatus in a buffer memory, (2) generate and transmit a type 1 control data when an underflow appears possible in the buffer memory to the data transmitting apparatus for shortening the transmission cycle, and (3) generate and transmit a type 2 control data when an overflow appears possible in the buffer memory to the data transmitting apparatus for lengthening the transmission cycle.

6. A data server system according to claim 2, wherein the updating means updates the stored cycle by making a progressively smaller adjustment to the stored cycle when the detecting means repeatedly detects that either of an underflow and an overflow appears possible.

* * * * *

UNITED STATES PATENT AND TRADEMARK OFFICE
CERTIFICATE OF CORRECTION

PATENT NO.     : 6,452,943 B1
DATED          : September 17, 2002
INVENTOR(S)    : Shinji Furuya It is certified that error appears in the above-identified patent and that said Letters Patent is hereby corrected as shown below:

Column 22,
Line 32, delete "dam" and insert -- data --.

Signed and Sealed this

Eighth Day of July, 2003

JAMES E. ROGAN
*Director of the United States Patent and Trademark Office*